(12) United States Patent
Hwang et al.

(10) Patent No.: US 11,956,773 B2
(45) Date of Patent: Apr. 9, 2024

(54) METHOD AND APPARATUS FOR PERFORMING SL COMMUNICATION ON BASIS OF PSFCH OVERHEAD IN NR V2X

(71) Applicant: LG ELECTRONICS INC., Seoul (KR)

(72) Inventors: Daesung Hwang, Seoul (KR); Seungmin Lee, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/696,528

(22) Filed: Mar. 16, 2022

(65) Prior Publication Data

US 2022/0210804 A1 Jun. 30, 2022

Related U.S. Application Data

(63) Continuation of application No. PCT/KR2021/004853, filed on Apr. 19, 2021.
(Continued)

(30) Foreign Application Priority Data

Apr. 28, 2020 (KR) .................. 10-2020-0051697
May 12, 2020 (KR) .................. 10-2020-0056586
Jun. 10, 2020 (KR) .................. 10-2020-0070181

(51) Int. Cl.
*H04W 72/20* (2023.01)
*H04L 5/00* (2006.01)
(Continued)

(52) U.S. Cl.
CPC ....... *H04W 72/1263* (2013.01); *H04L 5/0051* (2013.01); *H04W 72/20* (2023.01); *H04W 92/18* (2013.01)

(58) Field of Classification Search
CPC ......... H04W 72/1263; H04W 72/1278; H04W 92/18; H04W 72/20; H04L 5/0051
See application file for complete search history.

(56) References Cited

U.S. PATENT DOCUMENTS

2020/0099479 A1    3/2020 Park
2020/0351856 A1*  11/2020 Yeo .................. H04L 1/0061
(Continued)

FOREIGN PATENT DOCUMENTS

WO    WO-2021161602 A1 *  8/2021

OTHER PUBLICATIONS

Lien et al., "3GPP NR Sidelink Transmissions Toward 5G V2X," IEEE Access, Special Section on Communication and Fog/Edge Computing towards intelligent connected vehicles (ICVS), vol. 8, Feb. 13, 2020, pp. 35368-35382 (Year: 2020).*
(Continued)

*Primary Examiner* — Un C Cho
*Assistant Examiner* — Lalita W Pace
(74) *Attorney, Agent, or Firm* — LEE, HONG, DEGERMAN, KANG & WAIMEY

(57) ABSTRACT

Provided are a method for performing wireless communication by a first device and an apparatus supporting same. The method may comprise: transmitting, to a second device through a physical sidelink control channel (PSCCH), a first sidelink control information (SCI) including information related to a physical sidelink feedback channel (PSFCH) overhead and a beta offset; and transmitting, to the second device through a physical sidelink shared channel (PSSCH) related to the PSCCH, a second SCI, wherein a symbol length related to the PSSCH is obtained based on the information related to the PSFCH overhead, and wherein a number of resource elements (REs) to which the second SCI
(Continued)

is mapped is obtained based on the symbol length related to the PSSCH and the beta offset.

19 Claims, 20 Drawing Sheets

Related U.S. Application Data

(60) Provisional application No. 63/068,345, filed on Aug. 20, 2020, provisional application No. 63/027,945, filed on May 20, 2020.

(51) Int. Cl.
*H04W 72/1263* (2023.01)
*H04W 92/18* (2009.01)

(56) References Cited

U.S. PATENT DOCUMENTS

| | | | | |
|---|---|---|---|---|
| 2020/0404624 | A1* | 12/2020 | Roth | H04W 4/40 |
| 2021/0152408 | A1* | 5/2021 | Yeo | H04L 5/0051 |
| 2021/0211219 | A1* | 7/2021 | Sarkis | H04L 1/0041 |
| 2021/0314933 | A1* | 10/2021 | Zhang | H04L 1/1607 |
| 2021/0321403 | A1* | 10/2021 | Ye | H04L 5/0048 |
| 2021/0329604 | A1* | 10/2021 | Chen | H04W 72/04 |
| 2021/0352624 | A1* | 11/2021 | Akkarakaran | H04W 76/27 |
| 2022/0061041 | A1* | 2/2022 | Chen | H04L 5/0048 |
| 2022/0116925 | A1* | 4/2022 | Fouad | H04W 72/048 |
| 2023/0025146 | A1* | 1/2023 | Peng | H04W 72/0453 |

OTHER PUBLICATIONS

PCT International Application No. PCT/KR2021/004853, International Search Report dated Jul. 26, 2021, 4 pages.

Huawei et al., "Remaining details of sidelink physical layer structure," R1-2001550, 3GPP TSG RAN WG1 Meeting #100bis-e, Apr. 2020, 29 pages.

Intel Corporation, "Solutions to remaining opens of physical structure for NR V2X sidelink design," R1-2001992, 3GPP TSG RAN WG1 Meeting #100bis-E, Apr. 2020, 20 pages.

Qualcomm Incorporated, "Considerations on Physical Layer aspects of NR V2X," R1-2002537, 3GPP TSG RAN WG1 Meeting #100bis-e, Apr. 2020, 20 pages.

LG Electronics, "Discussion on physical layer structure for NR sidelink," R1-2001884, 3GPP TSG RAN WG1 Meeting #100bis, Apr. 2020, 40 pages.

3rd Generation Partnership Project, "Technical Specification Group Radio Access Network; NR; Physical layer procedures for data (Release 16)," 3GPP TS 38.214 V16.1.0, Mar. 2020, 151 pages.

European Patent Office Application Serial No. 21796493.1, extended Search Report dated Nov. 10, 2022, 9 pages.

Apple, "On Remaining Details of NR V2X Physical Layer Structure", R1-2002323, 3GPP TSG RAN WG1 #100bis, e-Meeting, Apr. 2020, 10 pages.

\* cited by examiner

●: TX UE
⊘: RX UE

METHOD AND APPARATUS FOR PERFORMING SL COMMUNICATION ON BASIS OF PSFCH OVERHEAD IN NR V2X

CROSS-REFERENCE TO RELATED APPLICATIONS

This application is a continuation of International Application No. PCT/KR2021/004853, filed on Apr. 19, 2021, which claims the benefit of earlier filing date and right of priority to Korean Application Nos. 10-2020-0051697 filed on Apr. 28, 2020, 10-2020-0056586 filed on May 12, 2020, and 10-2020-0070181 filed on Jun. 10, 2020, and also claims the benefit of U.S. Provisional Patent Application Nos. 63/027,945 filed on May 20, 2020, and 63/068,345 filed on Aug. 20, 2020, the contents of which are all hereby incorporated by reference herein in their entireties.

BACKGROUND OF THE DISCLOSURE

Field of the Disclosure

This disclosure relates to a wireless communication system.

Related Art

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic. Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

FIG. 1 is a drawing for describing V2X communication based on NR, compared to V2X communication based on RAT used before NR. The embodiment of FIG. 1 may be combined with various embodiments of the present disclosure.

Regarding V2X communication, a scheme of providing a safety service, based on a V2X message such as Basic Safety Message (BSM), Cooperative Awareness Message (CAM), and Decentralized Environmental Notification Message (DENM) is focused in the discussion on the RAT used before the NR. The V2X message may include position information, dynamic information, attribute information, or the like. For example, a UE may transmit a periodic message type CAM and/or an event triggered message type DENM to another UE.

Thereafter, regarding V2X communication, various V2X scenarios are proposed in NR. For example, the various V2X scenarios may include vehicle platooning, advanced driving, extended sensors, remote driving, or the like.

SUMMARY OF THE DISCLOSURE

Technical Objects

Meanwhile, the UE may determine a transport block size (TBS) based on the number of REs for the second SCI mapping. In this case, if the number of REs for the second SCI mapping is greatly changed between transmissions for the same TB, it may be difficult for the UE to indicate the same TBS value for the transmissions. Meanwhile, the UE needs to efficiently determine the number of REs to which the second SCI is mapped.

Technical Solutions

In one embodiment, provided is a method for performing wireless communication by a first device. The method may comprise: transmitting, to a second device through a physical sidelink control channel (PSCCH), a first sidelink control information (SCI) including information related to a physical sidelink feedback channel (PSFCH) overhead and a beta offset; and transmitting, to the second device through a physical sidelink shared channel (PSSCH) related to the PSCCH, a second SCI, wherein a symbol length related to the PSSCH is obtained based on the information related to the PSFCH overhead, and wherein a number of resource elements (REs) to which the second SCI is mapped is obtained based on the symbol length related to the PSSCH and the beta offset.

In one embodiment, provided is a first device configured to perform wireless communication. The first device may comprise: one or more memories storing instructions; one or more transceivers; and one or more processors connected to the one or more memories and the one or more transceivers. The one or more processors may execute the instructions to: transmit, to a second device through a physical sidelink control channel (PSCCH), a first sidelink control information (SCI) including information related to a physical sidelink feedback channel (PSFCH) overhead and a beta offset; and transmit, to the second device through a physical sidelink shared channel (PSSCH) related to the PSCCH, a second SCI, wherein a symbol length related to the PSSCH is obtained based on the information related to the PSFCH overhead, and wherein a number of resource elements (REs) to which the second SCI is mapped is obtained based on the symbol length related to the PSSCH and the beta offset.

Effects of the Disclosure

The user equipment (UE) can efficiently perform SL communication.

DESCRIPTION OF EXEMPLARY EMBODIMENTS

Figure 1:
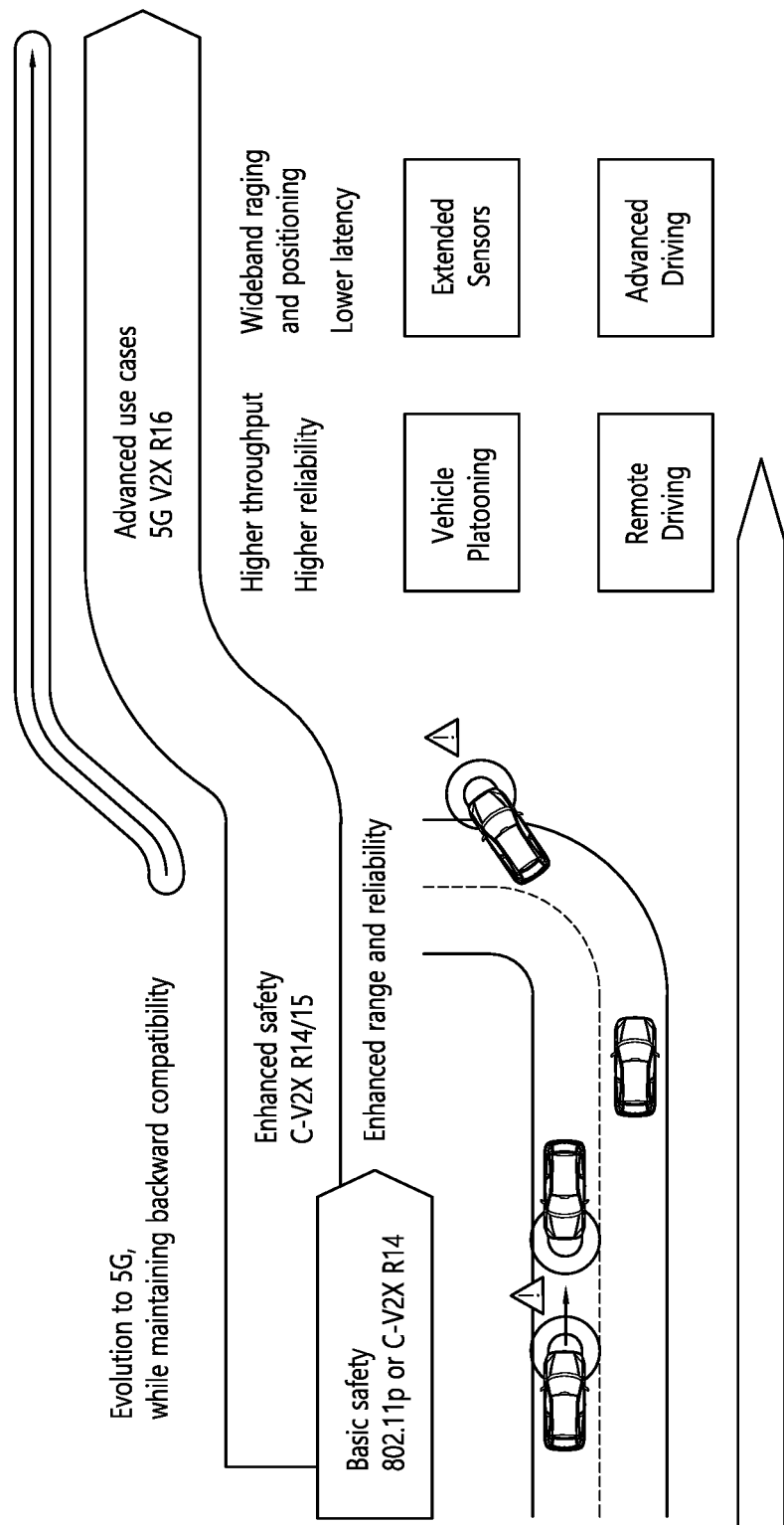
FIG. 1 is a drawing for describing V2X communication based on NR, compared to V2X communication based on RAT used before NR.

In the present specification, "A or B" may mean "only A", "only B" or "both A and B." In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (PDCCH)", it may mean that "PDCCH" is proposed as an example of the "control information". In other words, the "control information" of the present specification is not limited to "PDCCH", and "PDCCH" may be proposed as an example of the "control information". In addition, when indicated as "control information (i.e., PDCCH)", it may also mean that "PDCCH" is proposed as an example of the "control information".

A technical feature described individually in one figure in the present specification may be individually implemented, or may be simultaneously implemented.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

Figure 2:
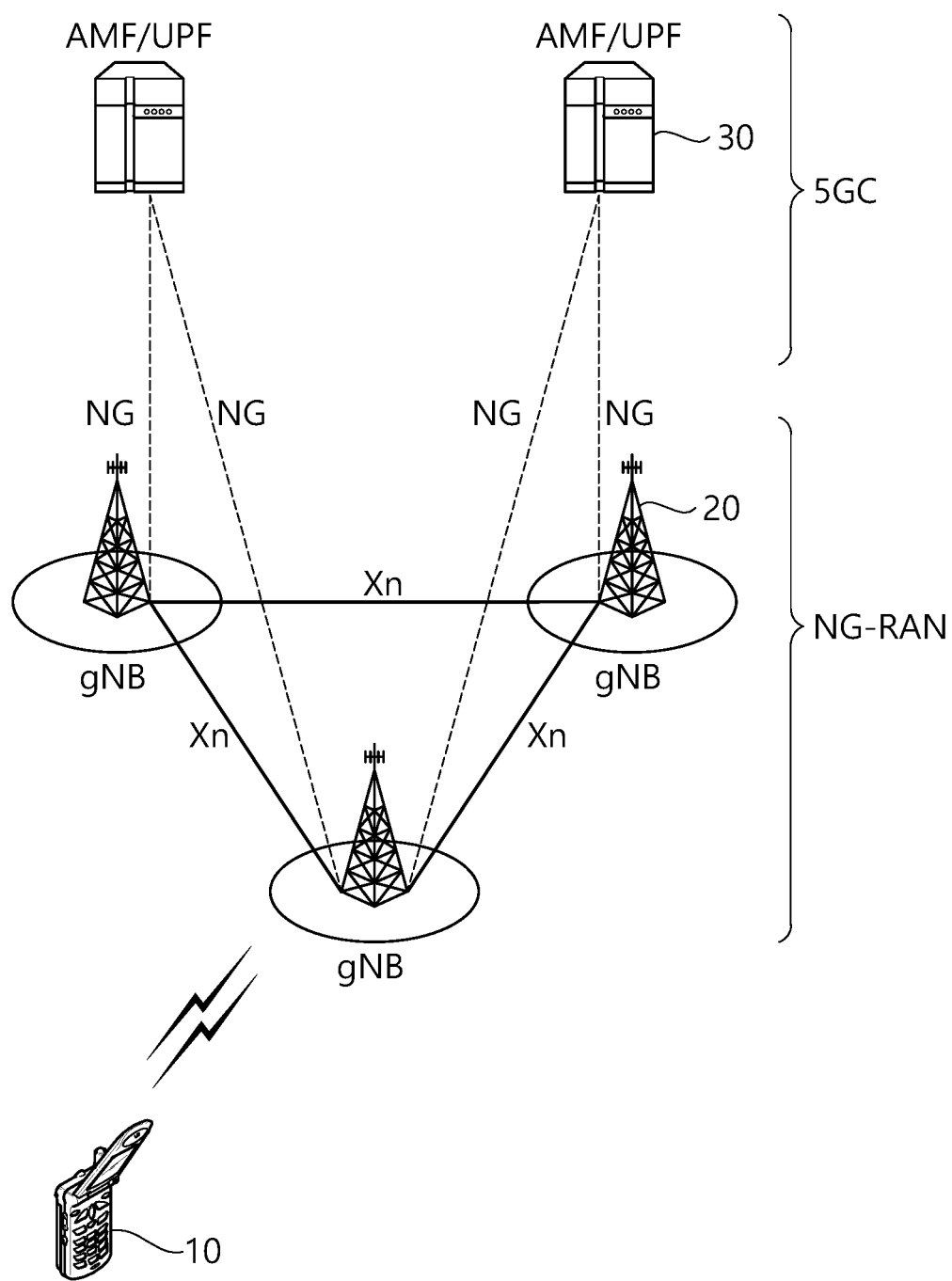
FIG. 2 shows a structure of an NR system, based on an embodiment of the present disclosure.

FIG. 2 shows a structure of an NR system, based on an embodiment of the present disclosure. The embodiment of FIG. 2 may be combined with various embodiments of the present disclosure.

Referring to FIG. 2, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 2 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Layers of a radio interface protocol between the UE and the network can be classified into a first layer (layer 1, L1), a second layer (layer 2, L2), and a third layer (layer 3, L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 3:
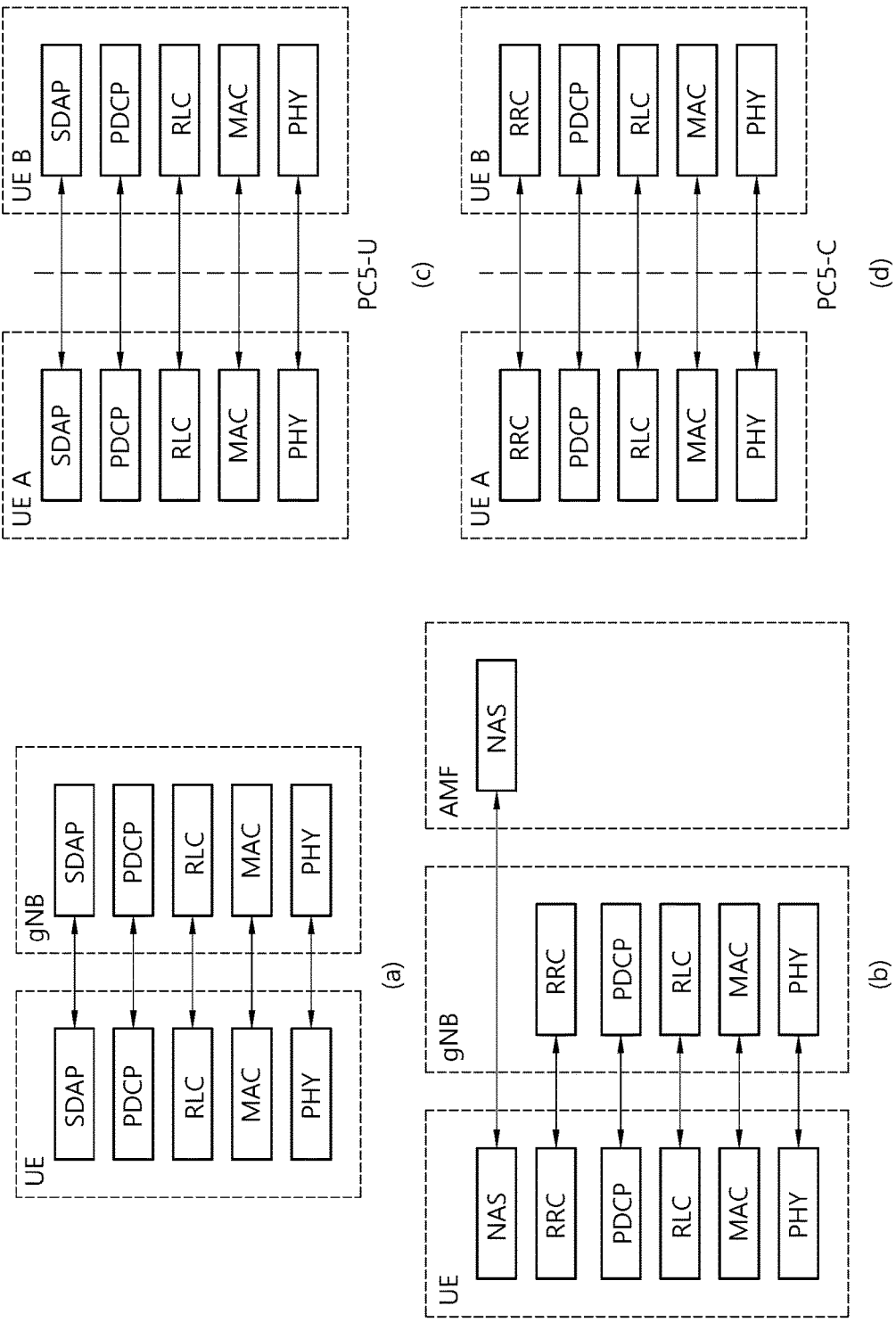
FIG. 3 shows a radio protocol architecture, based on an embodiment of the present disclosure.

FIG. 3 shows a radio protocol architecture, based on an embodiment of the present disclosure. The embodiment of FIG. 3 may be combined with various embodiments of the present disclosure. Specifically, (a) of FIG. 3 shows a radio protocol stack of a user plane for Uu communication, and (b) of FIG. 3 shows a radio protocol stack of a control plane for Uu communication. (c) of FIG. 3 shows a radio protocol stack of a user plane for SL communication, and (d) of FIG. 3 shows a radio protocol stack of a control plane for SL communication.

Referring to FIG. 3, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., a MAC layer, an RLC layer, a packet data convergence protocol (PDCP) layer, and a service data adaptation protocol (SDAP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

Figure 4:
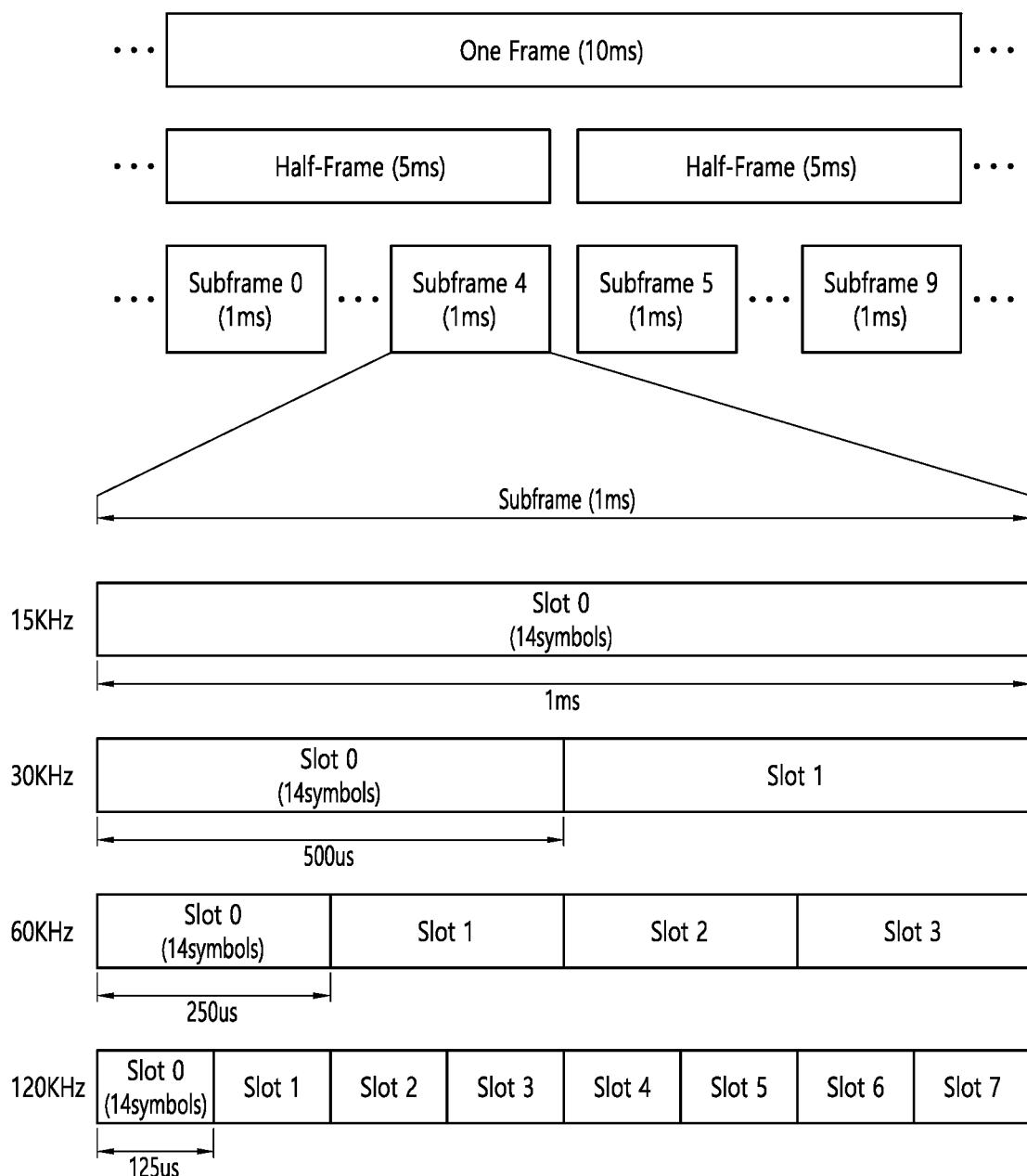
FIG. 4 shows a structure of a radio frame of an NR, based on an embodiment of the present disclosure.

FIG. 4 shows a structure of a radio frame of an NR, based on an embodiment of the present disclosure. The embodiment of FIG. 4 may be combined with various embodiments of the present disclosure.

Referring to FIG. 4, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined based on subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) based on an SCS configuration (u), in a case where a normal CP is used.

TABLE 1

| SCS (15*2$^u$) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe based on the SCS, in a case where an extended CP is used.

TABLE 2

| SCS (15*2$^u$) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 5:
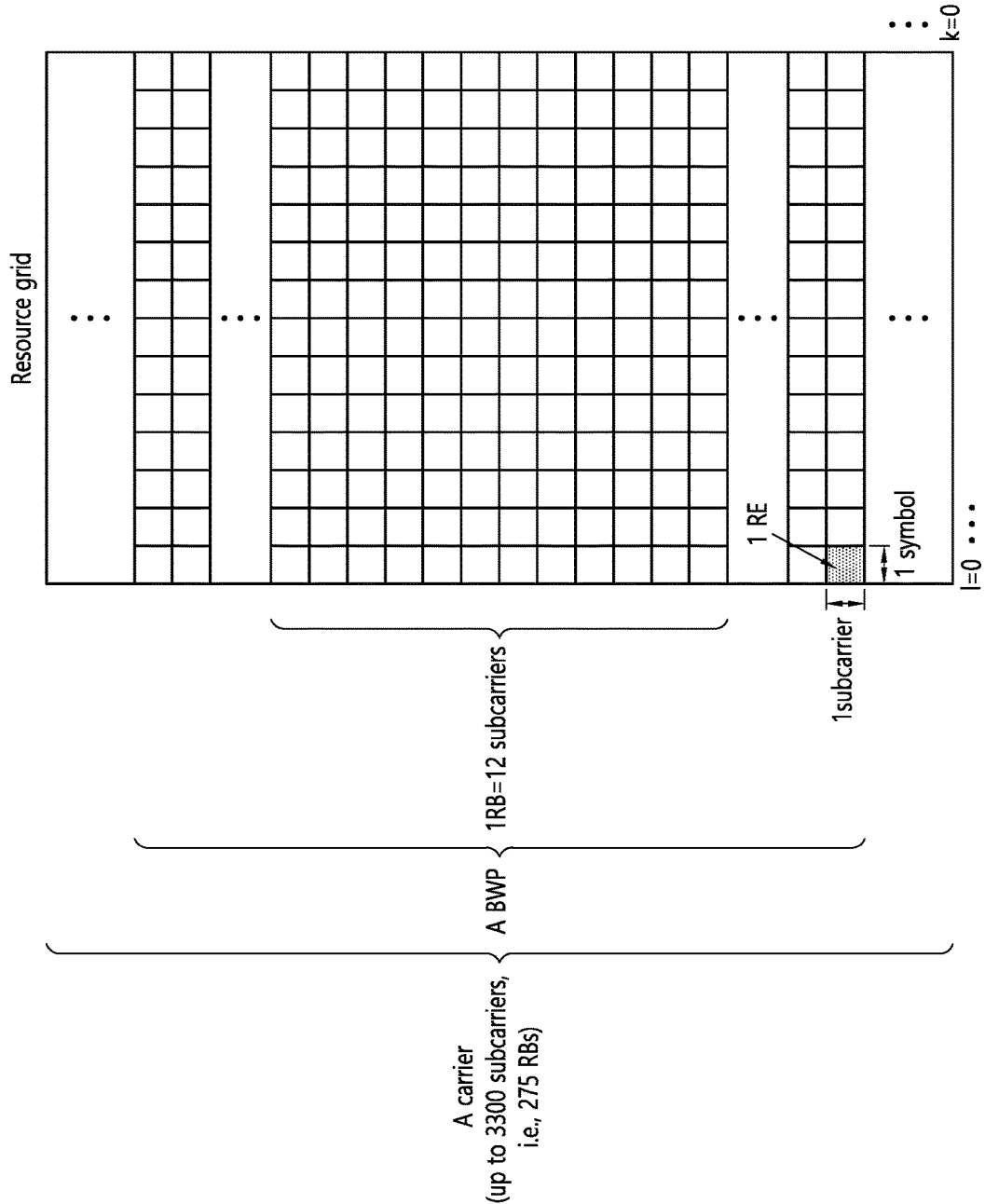
FIG. 5 shows a structure of a slot of an NR frame, based on an embodiment of the present disclosure.

FIG. 5 shows a structure of a slot of an NR frame, based on an embodiment of the present disclosure. The embodiment of FIG. 5 may be combined with various embodiments of the present disclosure.

Referring to FIG. 5, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, physical downlink shared channel (PDSCH), or channel state information-reference signal (CSI-RS) (excluding RRM) outside the active DL BWP. For example, the UE may not trigger a channel state information (CSI) report for the inactive DL BWP. For example, the UE may not transmit physical uplink control channel (PUCCH) or physical uplink shared channel (PUSCH) outside an active UL BWP. For example, in a downlink case, the initial BWP may be given as a consecutive RB set for a remaining minimum system information (RMSI) control resource set (CORESET) (configured by physical broadcast channel (PBCH)). For example, in an uplink case, the initial BWP may be given by system information block (SIB) for a random access procedure. For example, the default BWP may be configured by a higher layer. For example, an initial value of the default BWP may be an initial DL BWP. For energy saving, if the UE fails to detect downlink control information (DCI) during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. For example, the UE may receive a configuration for the Uu BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 6:
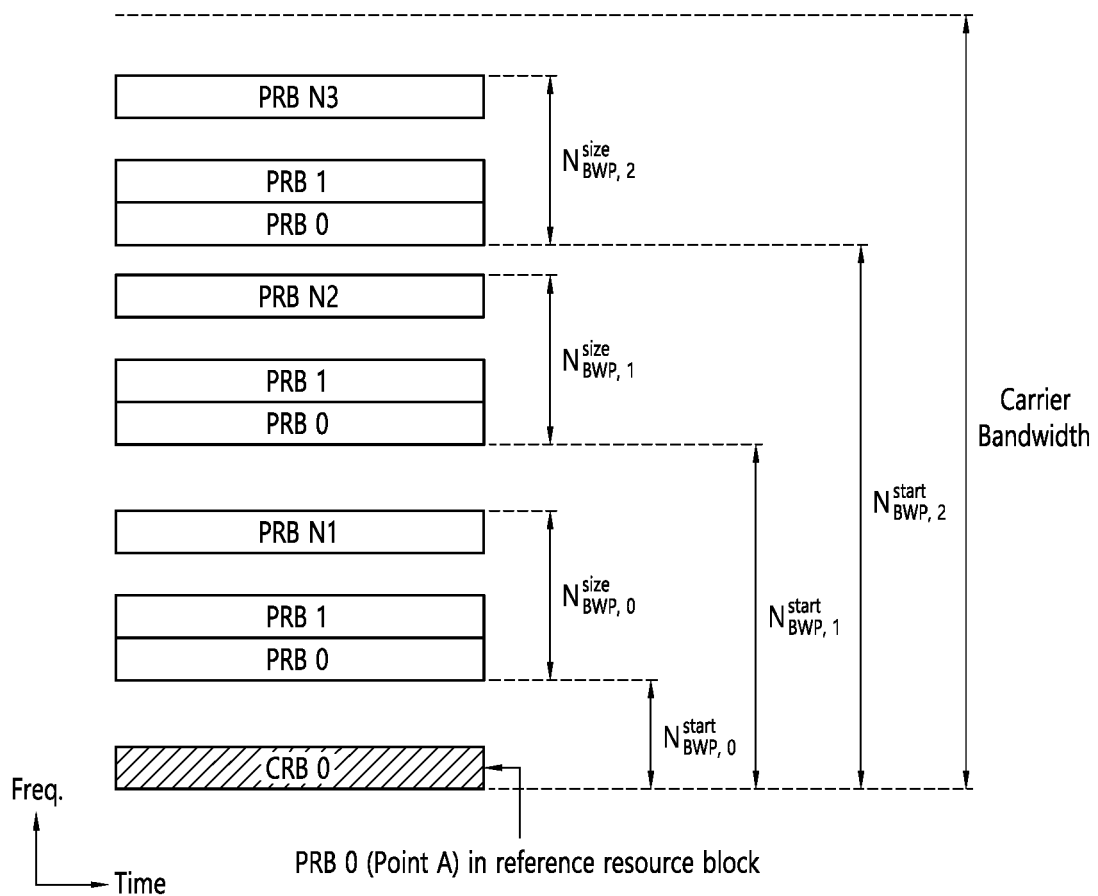
FIG. 6 shows an example of a BWP, based on an embodiment of the present disclosure.

FIG. 6 shows an example of a BWP, based on an embodiment of the present disclosure. The embodiment of FIG. 6 may be combined with various embodiments of the present disclosure. It is assumed in the embodiment of FIG. 6 that the number of BWPs is 3.

Referring to FIG. 6, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

A sidelink synchronization signal (SLSS) may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit cyclic redundancy check (CRC).

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 7:
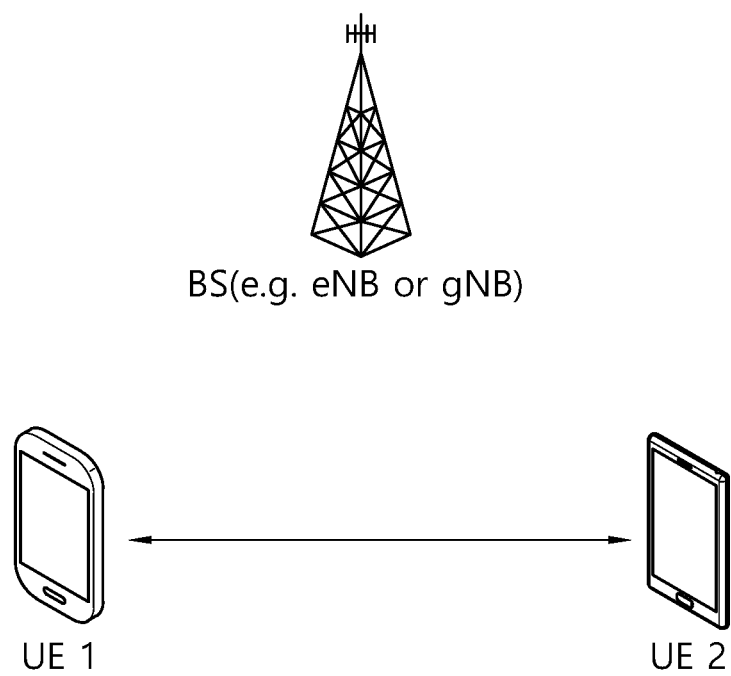
FIG. 7 shows a UE performing V2X or SL communication, based on an embodiment of the present disclosure.

FIG. 7 shows a UE performing V2X or SL communication, based on an embodiment of the present disclosure. The embodiment of FIG. 7 may be combined with various embodiments of the present disclosure.

Referring to FIG. 7, in V2X or SL communication, the term 'UE' may generally imply a UE of a user. However, if a network equipment such as a BS transmits/receives a signal according to a communication scheme between UEs, the BS may also be regarded as a sort of the UE. For example, a UE 1 may be a first apparatus 100, and a UE 2 may be a second apparatus 200.

For example, the UE 1 may select a resource unit corresponding to a specific resource in a resource pool which implies a set of series of resources. In addition, the UE 1 may transmit an SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the UE 1 of the resource pool. Otherwise, if the UE 1 is out of the connectivity range of the BS, another UE may inform the UE 1 of the resource pool, or the UE 1 may use a pre-configured resource pool.

In general, the resource pool may be configured in unit of a plurality of resources, and each UE may select a unit of one or a plurality of resources to use it in SL signal transmission thereof.

Hereinafter, resource allocation in SL will be described.

Figure 8:
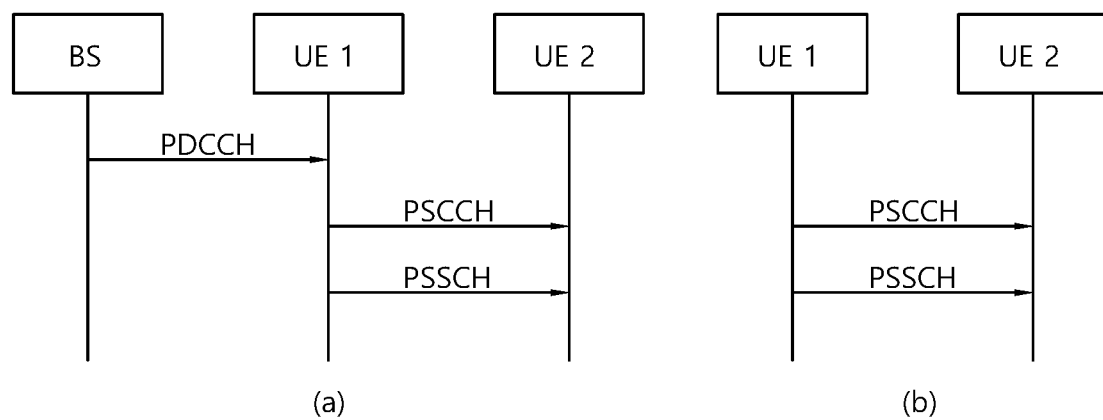
FIG. 8 shows a procedure of performing V2X or SL communication by a UE based on a transmission mode, based on an embodiment of the present disclosure.

FIG. 8 shows a procedure of performing V2X or SL communication by a UE based on a transmission mode, based on an embodiment of the present disclosure. The embodiment of FIG. 8 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, (a) of FIG. 8 shows a UE operation related to an LTE transmission mode 1 or an LTE transmission mode 3. Alternatively, for example, (a) of FIG. 8 shows a UE operation related to an NR resource allocation mode 1. For example, the LTE transmission mode 1 may be applied to general SL communication, and the LTE transmission mode 3 may be applied to V2X communication.

For example, (b) of FIG. 8 shows a UE operation related to an LTE transmission mode 2 or an LTE transmission mode 4. Alternatively, for example, (b) of FIG. 8 shows a UE operation related to an NR resource allocation mode 2.

Referring to (a) of FIG. 8, in the LTE transmission mode 1, the LTE transmission mode 3, or the NR resource allocation mode 1, a BS may schedule an SL resource to be used by the UE for SL transmission. For example, the BS may perform resource scheduling to a UE 1 through a PDCCH (e.g., downlink control information (DCI)) or RRC signaling (e.g., Configured Grant Type 1 or Configured Grant Type 2), and the UE 1 may perform V2X or SL communication with respect to a UE 2 according to the resource scheduling. For example, the UE 1 may transmit a sidelink control information (SCI) to the UE 2 through a physical sidelink control channel (PSCCH), and thereafter transmit data based on the SCI to the UE 2 through a physical sidelink shared channel (PSSCH).

Referring to (b) of FIG. 8, in the LTE transmission mode 2, the LTE transmission mode 4, or the NR resource allocation mode 2, the UE may determine an SL transmission resource within an SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannels. In addition, the UE 1 which has autonomously selected the resource within the resource pool may transmit the SCI to the UE 2 through a PSCCH, and thereafter may transmit data based on the SCI to the UE 2 through a PSSCH.

Figure 9:
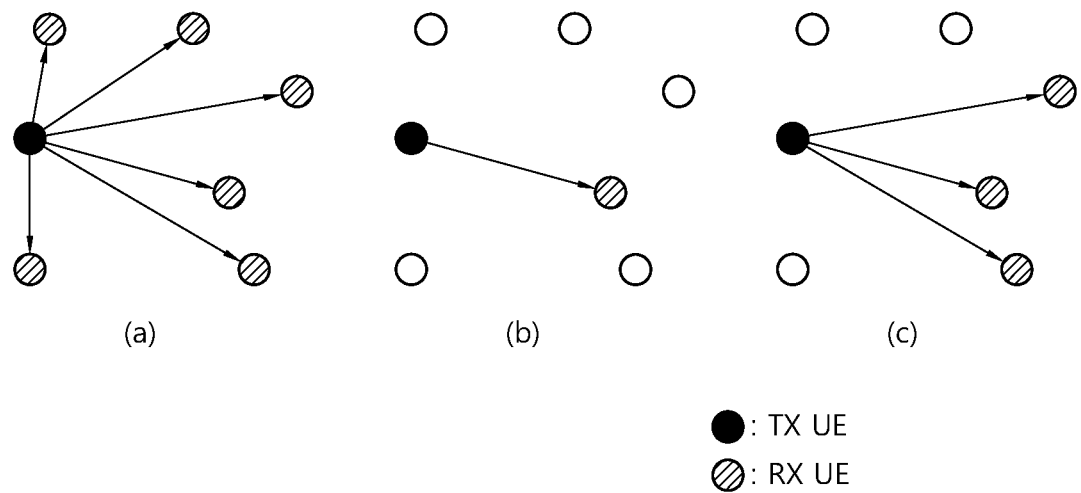
FIG. 9 shows three cast types, based on an embodiment of the present disclosure.

FIG. 9 shows three cast types, based on an embodiment of the present disclosure. The embodiment of FIG. 9 may be combined with various embodiments of the present disclosure. Specifically, (a) of FIG. 9 shows broadcast-type SL communication, (b) of FIG. 9 shows unicast type-SL communication, and (c) of FIG. 9 shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Hereinafter, sidelink (SL) congestion control will be described.

If a UE autonomously determines an SL transmission resource, the UE also autonomously determines a size and frequency of use for a resource used by the UE. Of course, due to a constraint from a network or the like, it may be restricted to use a resource size or frequency of use, which is greater than or equal to a specific level. However, if all UEs use a relatively great amount of resources in a situation where many UEs are concentrated in a specific region at a specific time, overall performance may significantly deteriorate due to mutual interference.

Accordingly, the UE may need to observe a channel situation. If it is determined that an excessively great amount of resources are consumed, it is preferable that the UE autonomously decreases the use of resources. In the present disclosure, this may be defined as congestion control (CR). For example, the UE may determine whether energy measured in a unit time/frequency resource is greater than or equal to a specific level, and may adjust an amount and frequency of use for its transmission resource based on a ratio of the unit time/frequency resource in which the energy greater than or equal to the specific level is observed. In the present disclosure, the ratio of the time/frequency resource in which the energy greater than or equal to the specific level is observed may be defined as a channel busy ratio (CBR).

The UE may measure the CBR for a channel/frequency. Additionally, the UE may transmit the measured CBR to the network/BS.

Figure 10:
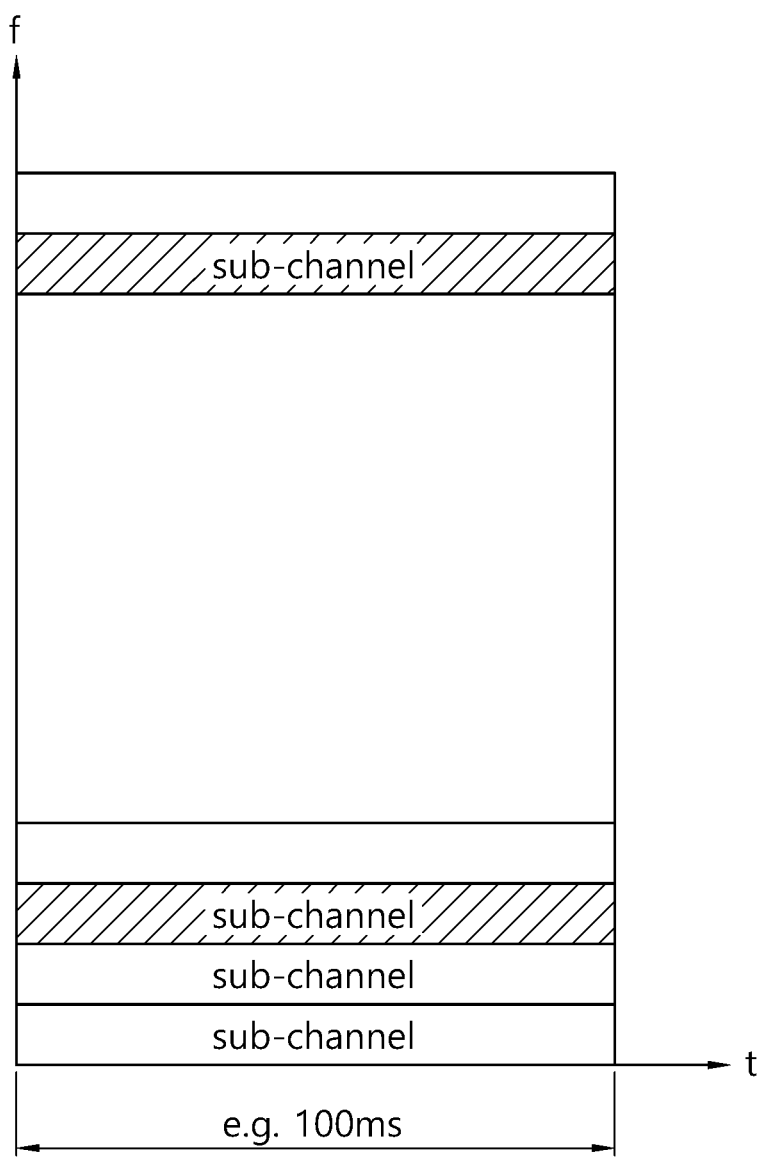
FIG. 10 shows a resource unit for CBR measurement, based on an embodiment of the present disclosure.

FIG. 10 shows a resource unit for CBR measurement, based on an embodiment of the present disclosure. The embodiment of FIG. 10 may be combined with various embodiments of the present disclosure.

Referring to FIG. 10, CBR may denote the number of sub-channels in which a measurement result value of a received signal strength indicator (RSSI) has a value greater than or equal to a pre-configured threshold as a result of measuring the RSSI by a UE on a sub-channel basis for a specific period (e.g., 100 ms). Alternatively, the CBR may denote a ratio of sub-channels having a value greater than or equal to a pre-configured threshold among sub-channels for a specific duration. For example, in the embodiment of FIG. 10, if it is assumed that a hatched sub-channel is a sub-channel having a value greater than or equal to a pre-configured threshold, the CBR may denote a ratio of the hatched sub-channels for a period of 100 ms. Additionally, the UE may report the CBR to the BS.

Further, congestion control considering a priority of traffic (e.g. packet) may be necessary. To this end, for example, the UE may measure a channel occupancy ratio (CR). Specifically, the UE may measure the CBR, and the UE may determine a maximum value CRlimitk of a channel occupancy ratio k (CRk) that can be occupied by traffic corresponding to each priority (e.g., k) based on the CBR. For example, the UE may derive the maximum value CRlimitk of the channel occupancy ratio with respect to a priority of each traffic, based on a predetermined table of CBR measurement values. For example, in case of traffic having a relatively high priority, the UE may derive a maximum value of a relatively great channel occupancy ratio. Thereafter, the UE may perform congestion control by restricting a total sum of channel occupancy ratios of traffic, of which a priority k is lower than i, to a value less than or equal to a specific value. Based on this method, the channel occupancy ratio may be more strictly restricted for traffic having a relatively low priority.

In addition thereto, the UE may perform SL congestion control by using a method of adjusting a level of transmit power, dropping a packet, determining whether retransmission is to be performed, adjusting a transmission RB size (Modulation and Coding Scheme (MCS) coordination), or the like.

Hereinafter, a hybrid automatic repeat request (HARQ) procedure will be described.

In case of SL unicast and groupcast, HARQ feedback and HARQ combining in the physical layer may be supported. For example, when a receiving UE operates in a resource allocation mode 1 or 2, the receiving UE may receive the PSSCH from a transmitting UE, and the receiving UE may transmit HARQ feedback for the PSSCH to the transmitting UE by using a sidelink feedback control information (SFCI) format through a physical sidelink feedback channel (PSFCH).

For example, the SL HARQ feedback may be enabled for unicast. In this case, in a non-code block group (non-CBG) operation, if the receiving UE decodes a PSCCH of which a target is the receiving UE and if the receiving UE successfully decodes a transport block related to the PSCCH, the receiving UE may generate HARQ-ACK. In addition, the receiving UE may transmit the HARQ-ACK to the transmitting UE. Otherwise, if the receiving UE cannot successfully decode the transport block after decoding the PSCCH of which the target is the receiving UE, the receiving UE may generate the HARQ-NACK. In addition, the receiving UE may transmit HARQ-NACK to the transmitting UE.

For example, the SL HARQ feedback may be enabled for groupcast. For example, in the non-CBG operation, two HARQ feedback options may be supported for groupcast.

(1) Groupcast option 1: After the receiving UE decodes the PSCCH of which the target is the receiving UE, if the receiving UE fails in decoding of a transport block related to the PSCCH, the receiving UE may transmit HARQ-NACK to the transmitting UE through a PSFCH. Otherwise, if the receiving UE decodes the PSCCH of which the target is the receiving UE and if the receiving UE successfully decodes the transport block related to the PSCCH, the receiving UE may not transmit the HARQ-ACK to the transmitting UE.

(2) Groupcast option 2: After the receiving UE decodes the PSCCH of which the target is the receiving UE, if the receiving UE fails in decoding of the transport block related to the PSCCH, the receiving UE may transmit HARQ-NACK to the transmitting UE through the PSFCH. In addition, if the receiving UE decodes the PSCCH of which the target is the receiving UE and if the receiving UE successfully decodes the transport block related to the PSCCH, the receiving UE may transmit the HARQ-ACK to the transmitting UE through the PSFCH.

For example, if the groupcast option 1 is used in the SL HARQ feedback, all UEs performing groupcast communication may share a PSFCH resource. For example, UEs belonging to the same group may transmit HARQ feedback by using the same PSFCH resource.

For example, if the groupcast option 2 is used in the SL HARQ feedback, each UE performing groupcast communication may use a different PSFCH resource for HARQ feedback transmission. For example, UEs belonging to the same group may transmit HARQ feedback by using different PSFCH resources.

For example, when the SL HARQ feedback is enabled for groupcast, the receiving UE may determine whether to transmit the HARQ feedback to the transmitting UE based on a transmission-reception (TX-RX) distance and/or reference signal received power (RSRP).

For example, in the groupcast option 1, in case of the TX-RX distance-based HARQ feedback, if the TX-RX distance is less than or equal to a communication range requirement, the receiving UE may transmit HARQ feedback for the PSSCH to the transmitting UE. Otherwise, if the TX-RX distance is greater than the communication range requirement, the receiving UE may not transmit the HARQ feedback for the PSSCH to the transmitting UE. For example, the transmitting UE may inform the receiving UE of a location of the transmitting UE through SCI related to the PSSCH. For example, the SCI related to the PSSCH may be second SCI. For example, the receiving UE may estimate or obtain the TX-RX distance based on a location of the receiving UE and the location of the transmitting UE. For example, the receiving UE may decode the SCI related to the PSSCH and thus may know the communication range requirement used in the PSSCH.

For example, in case of the resource allocation mode 1, a time (offset) between the PSFCH and the PSSCH may be configured or pre-configured. In case of unicast and groupcast, if retransmission is necessary on SL, this may be indicated to a BS by an in-coverage UE which uses the PUCCH. The transmitting UE may transmit an indication to a serving BS of the transmitting UE in a form of scheduling request (SR)/buffer status report (BSR), not a form of HARQ ACK/NACK. In addition, even if the BS does not receive the indication, the BS may schedule an SL retransmission resource to the UE. For example, in case of the resource allocation mode 2, a time (offset) between the PSFCH and the PSSCH may be configured or pre-configured.

For example, from a perspective of UE transmission in a carrier, TDM between the PSCCH/PSSCH and the PSFCH may be allowed for a PSFCH format for SL in a slot. For example, a sequence-based PSFCH format having a single symbol may be supported. Herein, the single symbol may not an AGC duration. For example, the sequence-based PSFCH format may be applied to unicast and groupcast.

For example, in a slot related to a resource pool, a PSFCH resource may be configured periodically as N slot durations, or may be pre-configured. For example, N may be configured as one or more values greater than or equal to 1. For example, N may be 1, 2, or 4. For example, HARQ feedback for transmission in a specific resource pool may be transmitted only through a PSFCH on the specific resource pool.

For example, if the transmitting UE transmits the PSSCH to the receiving UE across a slot #X to a slot #N, the receiving UE may transmit HARQ feedback for the PSSCH to the transmitting UE in a slot #(N+A). For example, the slot #(N+A) may include a PSFCH resource. Herein, for example, A may be a smallest integer greater than or equal to K. For example, K may be the number of logical slots. In this case, K may be the number of slots in a resource pool. Alternatively, for example, K may be the number of physical slots. In this case, K may be the number of slots inside or outside the resource pool.

For example, if the receiving UE transmits HARQ feedback on a PSFCH resource in response to one PSSCH transmitted by the transmitting UE to the receiving UE, the receiving UE may determine a frequency domain and/or code domain of the PSFCH resource based on an implicit mechanism in a configured resource pool. For example, the receiving UE may determine the frequency domain and/or code domain of the PSFCH resource, based on at least one of a slot index related to PSCCH/PSSCH/PSFCH, a sub-channel related to PSCCH/PSSCH, and/or an identifier for identifying each receiving UE in a group for HARQ feedback based on the groupcast option 2. Additionally/alternatively, for example, the receiving UE may determine the frequency domain and/or code domain of the PSFCH resource, based on at least one of SL RSRP, SINR, L1 source ID, and/or location information.

For example, if HARQ feedback transmission through the PSFCH of the UE and HARQ feedback reception through the PSFCH overlap, the UE may select any one of HARQ feedback transmission through the PSFCH and HARQ feedback reception through the PSFCH based on a priority rule. For example, the priority rule may be based on at least priority indication of the related PSCCH/PSSCH.

For example, if HARQ feedback transmission of a UE through a PSFCH for a plurality of UEs overlaps, the UE may select specific HARQ feedback transmission based on the priority rule. For example, the priority rule may be based on at least priority indication of the related PSCCH/PSSCH.

Hereinafter, a sidelink control information (SCI) will be described.

Control information transmitted by a BS to a UE through a PDCCH may be referred to as downlink control information (DCI), whereas control information transmitted by the UE to another UE through a PSCCH may be referred to as SCI. For example, the UE may know in advance a start symbol of the PSCCH and/or the number of symbols of the PSCCH, before decoding the PSCCH. For example, the SCI may include SL scheduling information. For example, the UE may transmit at least one SCI to another UE to schedule the PSSCH. For example, one or more SCI formats may be defined.

For example, a transmitting UE may transmit the SCI to a receiving UE on the PSCCH. The receiving UE may decode one SCI to receive the PSSCH from the transmitting UE.

For example, the transmitting UE may transmit two consecutive SCIs (e.g., 2-stage SCI) to the receiving UE on the PSCCH and/or the PSSCH. The receiving UE may decode the two consecutive SCIs (e.g., 2-stage SCI) to receive the PSSCH from the transmitting UE. For example, if SCI configuration fields are divided into two groups in consideration of a (relatively) high SCI payload size, an SCI including a first SCI configuration field group may be referred to as a first SCI or a $1^{st}$ SCI, and an SCI including a second SCI configuration field group may be referred to as a second SCI or a $2^{nd}$ SCI. For example, the transmitting UE may transmit the first SCI to the receiving UE through the PSCCH. For example, the transmitting UE may transmit the second SCI to the receiving UE on the PSCCH and/or the PSSCH. For example, the second SCI may be transmitted to the receiving UE through an (independent) PSCCH, or may be transmitted in a piggyback manner together with data through the PSSCH. For example, two consecutive SCIs may also be applied to different transmissions (e.g., unicast, broadcast, or groupcast).

For example, the transmitting UE may transmit the entirety or part of information described below to the receiving UE through the SCI. Herein, for example, the transmitting UE may transmit the entirety or part of the information described below to the receiving UE through the first SCI and/or the second SCI.

- PSSCH and/or PSCCH related resource allocation information, e.g., the number/positions of time/frequency resources, resource reservation information (e.g., period), and/or
- SL CSI report request indicator or SL (L1) RSRP (and/or SL (L1) RSRQ and/or SL (L1) RSSI) report request indicator, and/or
- SL CSI transmission indicator (or SL (L1) RSRP (and/or SL (L1) RSRQ and/or SL (L1) RSSI) information transmission indicator)) (on PSSCH), and/or
- MCS information, and/or
- Transmit power information, and/or
- L1 destination ID information and/or L1 source ID information, and/or
- SL HARQ process ID information, and/or
- New data indicator (NDI) information, and/or
- Redundancy version (RV) information, and/or
- (Transmission traffic/packet related) QoS information, e.g., priority information, and/or
- SL CSI-RS transmission indicator or information on the number of (to-be-transmitted) SL CSI-RS antenna ports, and/or
- Location information of a transmitting UE or location (or distance region) information of a target receiving UE (for which SL HARQ feedback is requested), and/or
- Reference signal (e.g., DMRS, etc.) related to channel estimation and/or decoding of data to be transmitted through a PSSCH, e.g., information related to a pattern of a (time-frequency) mapping resource of DMRS, rank information, antenna port index information For example, the first SCI may include information related to channel sensing. For example, the receiving UE may decode the second SCI by using a PSSCH DMRS. A polar code used in a PDCCH may be applied to the second SCI. For example, in a resource pool, a payload size of the first SCI may be identical for unicast, groupcast, and broadcast. After decoding the first SCI, the receiving UE does not have to perform blind decoding of the second SCI. For example, the first SCI may include scheduling information of the second SCI.

Meanwhile, in various embodiments of the present disclosure, since a transmitting UE may transmit at least one of a SCI, a first SCI, and/or a second SCI to a receiving UE through a PSCCH, the PSCCH may be replaced/substituted with at least one of the SCI, the first SCI and/or the second SCI. Additionally/alternatively, for example, the SCI may be replaced/substituted with at least one of the PSCCH, the first SCI, and/or the second SCI. Additionally/alternatively, for example, since a transmitting UE may transmit a second SCI to a receiving UE through a PSSCH, the PSSCH may be replaced/substituted with the second SCI.

In the present disclosure, the term "configuration/configured or definition/defined" may be interpreted as being (pre-)configured from the base station or the network (through predefined signaling (e.g., SIB, MAC signaling, RRC signaling)). For example, "A may be configured" may include "that the base station or the network (pre-)configures/defines or informs A to the UE". Alternatively, the term "configuration/configured or definition/defined" may be interpreted as being pre-configured or pre-defined in the system. For example, "A may be configured" may include "that A is pre-configured/defined in the system".

Meanwhile, in the NR system, the UE may perform a transport block size (TBS) determination procedure for medium access control (MAC) protocol data unit (PDU) transmission. Unlike in the LTE system, since flexible TTI and time domain resource allocation are adopted in the NR system, the UE may determine a TBS based on equations and not based on tables. Nevertheless, in case an intermediate number of information bits is less than a specific value (e.g., 3824), the UE may also determine a TBS based on Table 5. More specifically, in the NR system, reference may be made to 3GPP TS 38.214 V16.1.0 for the TBS determination procedure of the UE.

Hereinafter, a procedure for a UE to determine a TBS for communication with a base station in an NR system will be briefly described.

Firstly, in a first phase (or step), the UE may determine a number of REs ($N'_{RE}$) allocated for PUSCH within a single Physical Resource Block (PRB), or the UE may determine a number of REs ($N'_{RE}$) allocated for PDSCH within a single Physical Resource Block (PRB). $N'_{RE}$ may be obtained by Equation 1.

$$N'_{RE} = N^{RB}_{sc} \cdot N^{sh}_{symb} - N^{PRB}_{DMRS} - N^{PRB}_{oh} \quad \text{[Equation 1]}$$

Herein, $N^{RB}_{sc}$ may be a number of subcarriers within a frequency domain within a PRB. For example, $N^{RB}_{sc}$ may be equal to 12. For example, in the case of TBS determination for PUSCH, $N^{sh}_{symb}$ may be a number of symbols of PUSCH allocation within a slot. For example, in the case of TBS determination for PDSCH, $N^{sh}_{symb}$ may be a number of symbols of PDSCH allocation within a slot. For example, $N^{PRB}_{DMRS}$ may be a number of Resource Elements (REs) for DM-RS(s) per a PRB during an allocated duration or a scheduled duration including an overhead of a DM-RS CDM group. $N^{PRB}_{oh}$ may be an overhead being configured by a high layer parameter. If a high layer parameter is not configured, $N^{PRB}_{oh}$ may be assumed to be equal to 0.

Thereafter, in a second phase (or step), the UE may determine a total number of REs ($N_{RE}$) being allocated for PUSCH, or the UE may determine a total number of REs ($N_{RE}$) being allocated for PDSCH. $N_{RE}$ may be obtained by Equation 2.

$$N_{RE} = \min(156, N'_{RE}) \cdot n_{PRB} \quad \text{[Equation 2]}$$

Herein, $n_{PRB}$ may be a total number of PRBs being allocated for the UE. That is, the UE may obtain $N_{RE}$ by multiplying a smaller number between $N'_{RE}$ and 156 by $n_{PR}B$.

Then, in a third phase (or step), the UE may obtain an intermediate number of information bits ($N_{info}$). $N_{info}$ may be obtained by Equation 3.

$$N_{info} = N_{RE} \cdot R \cdot Q_m \cdot v \quad \text{[Equation 3]}$$

Herein, R may be a code rate, and $Q_m$ may be a modulation order. v may be a number of layers.

Figure 11:
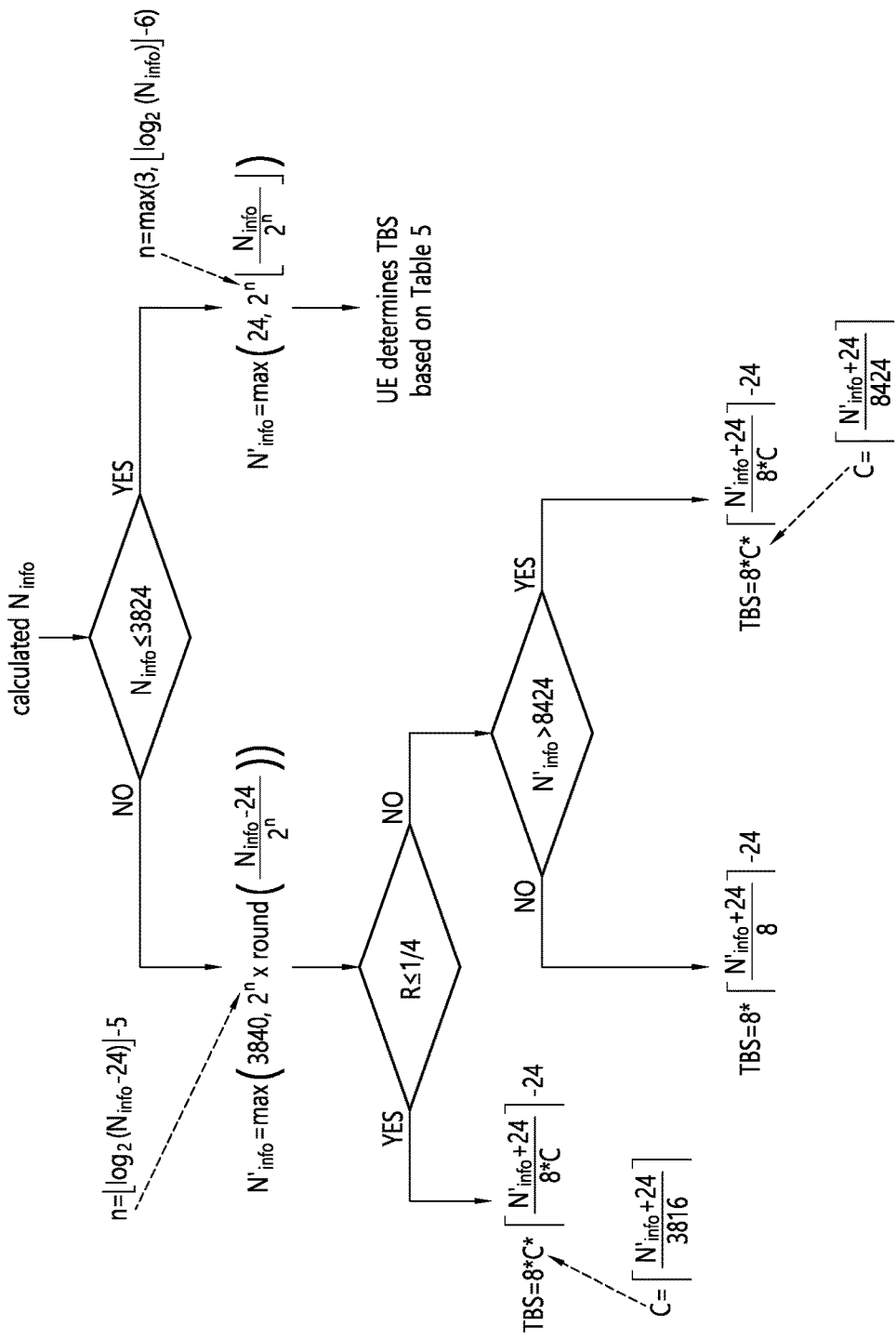
FIG. 11 shows a flowchart for TBS determination, based on an embodiment of the present disclosure.

Finally, in a fourth phase (or step), based on a calculated $N_{info}$, the UE may determine a TBS according to the procedure shown in FIG. 11.

FIG. 11 shows a flowchart for TBS determination, based on an embodiment of the present disclosure. The embodiment of FIG. 11 may be combined with various embodiments of the present disclosure.

Meanwhile, in case $N_{info}$ is equal to 3824 or less, the UE may determine the TBS based on Table 5.

TABLE 5

| Index | TBS |
| --- | --- |
| 1 | 24 |
| 2 | 32 |
| 3 | 40 |
| 4 | 48 |
| 5 | 56 |
| 6 | 64 |
| 7 | 72 |
| 8 | 80 |
| 9 | 88 |
| 10 | 96 |
| 11 | 104 |
| 12 | 112 |
| 13 | 120 |
| 14 | 128 |
| 15 | 136 |
| 16 | 144 |
| 17 | 152 |
| 18 | 160 |
| 19 | 168 |
| 20 | 176 |
| 21 | 184 |
| 22 | 192 |
| 23 | 208 |
| 24 | 224 |
| 25 | 240 |
| 26 | 256 |
| 27 | 272 |
| 28 | 288 |
| 29 | 304 |
| 30 | 320 |
| 31 | 336 |
| 32 | 352 |
| 33 | 368 |
| 34 | 384 |
| 35 | 408 |
| 36 | 432 |
| 37 | 456 |
| 38 | 480 |
| 39 | 504 |
| 40 | 528 |
| 41 | 552 |
| 42 | 576 |
| 43 | 608 |
| 44 | 640 |
| 45 | 672 |
| 46 | 704 |
| 47 | 736 |
| 48 | 768 |
| 49 | 808 |
| 50 | 848 |
| 51 | 888 |
| 52 | 928 |
| 53 | 984 |
| 54 | 1032 |
| 55 | 1064 |
| 56 | 1128 |
| 57 | 1160 |
| 58 | 1192 |
| 59 | 1224 |
| 60 | 1256 |
| 61 | 1288 |
| 62 | 1320 |
| 63 | 1352 |
| 64 | 1416 |
| 65 | 1480 |
| 66 | 1544 |
| 67 | 1608 |
| 68 | 1672 |
| 69 | 1736 |
| 70 | 1800 |
| 71 | 1864 |
| 72 | 1928 |
| 73 | 2024 |
| 74 | 2088 |
| 75 | 2152 |
| 76 | 2216 |
| 77 | 2280 |
| 78 | 2408 |
| 79 | 2472 |
| 80 | 2536 |
| 81 | 2600 |
| 82 | 2664 |
| 83 | 2728 |
| 84 | 2792 |
| 85 | 2856 |
| 86 | 2976 |
| 87 | 3104 |
| 88 | 3240 |
| 89 | 3368 |
| 90 | 3496 |
| 91 | 3624 |
| 92 | 3752 |
| 93 | 3824 |

Hereinafter, a method for the UE to determine a TBS for SL communication in the NR system and an apparatus supporting the same will be described.

First, in the first step, the UE may determine the number of REs ($N'_{RE}$) allocated for a PSSCH in one physical resource block (PRB). For example, $N'_{RE}$ may be obtained by one of Equations 4 to 7.

$$N'_{RE} = N_{sc}^{RB} \cdot N_{symb}^{sh} - N_{oh}^{PRB} \quad \text{[Equation 4]}$$

$$N'_{RE} = N_{sc}^{RB} \cdot N_{symb}^{sh} - N_{DMRS}^{PRB} N_{oh}^{PRB} \quad \text{[Equation 5]}$$

$$N'_{RE} = N_{sc}^{RB} \cdot (N_{symb}^{sh} - N_{symb}^{PSFCH}) - N_{oh}^{PRB} \quad \text{[Equation 6]}$$

$$N'_{RE} = N_{sc}^{RB} \cdot (N_{sh}^{symb} - N_{symb}^{PSFCH}) - N^{PRB} - N^{PRB} \quad \text{[Equation 7]}$$

Herein, $N_{sc}^{RB}$ may be the number of subcarriers in a frequency domain in a PRB. For example, $N_{sc}^{RB}$ may be 12. For example, $N_{symb}^{sh}$ may be the number of symbols allocated for the PSSCH within the slot. For example, $N_{symb}^{PSFCH}$ may be the number of symbols allocated for a PSFCH within the slot. For example, $N_{DMRS}^{PRB}$ may be a number of Resource Elements (REs) for DM-RS(s) per a PRB during an allocated duration or a scheduled duration including an overhead of a DM-RS CDM group. For example, $N_{oh}^{PRB}$ may be an overhead configured by a higher layer parameter. If the higher layer parameter is not configured, $N^{PRB}_{oh}$ may be assumed to be 0.

Then, in the second step, the UE may determine the total number of REs allocated for the PSSCH ($N_{RE}$). For example, $N_{RE}$ may be obtained by one of Equations 8 to 12.

$$N_{RE}=\min(N_{max},N'_{RE})\cdot n_{PRB} \quad\quad\text{[Equation 8]}$$

$$N_{RE}=\min(N_{max},N'_{RE})\cdot n_{PRB}-N_{PSCCH} \quad\quad\text{[Equation 9]}$$

$$N_{RE}=\min(N_{max},N'_{RE})\cdot n_{PRB}-N_{PSCCH}-N_{oh}^{2ndSCI} \quad\quad\text{[Equation 10]}$$

$$N_{RE}=\min(N_{max},N'_{RE})\cdot n_{PRB}-N_{PSCCH}-N_{oh}^{DMRS} \quad\quad\text{[Equation 11]}$$

$$N_{RE}=\min(N_{max},N'_{RE})\cdot n_{PRB}-N_{PSCCH}-N_{oh}^{DMRS}-N_{oh}^{2ndSCI} \quad\quad\text{[Equation 12]}$$

Here, $n_{PRB}$ may be the total number of PRBs allocated for the UE. For example, $N_{max}$ may be an upper limit value. For example, $N_{max}$ may be 156. For example, $N_{PSCCH}$ may be the correct (or actual) number of REs for the PSCCH. For example, $N_{PSCCH}$ may be the number of REs for the PSCCH in the total PRB allocated for the UE. For example, the number of REs for the PSCCH may include the number of REs to which DMRS(s) transmitted through the PSCCH (i.e., PSCCH DMRS(s)) is mapped. For example, REs for the PSCCH may include REs to which control information transmitted through the PSCCH is mapped and REs to which DMRS(s) transmitted through the PSCCH (i.e., PSCCH DMRS(s)) is mapped. That is, the UE may determine the number of reference REs by subtracting the number of REs related to the PSCCH from a value obtained by multiplying the smallest number among $N'_{RE}$ and $N_{max}$ by $n_{PRB}$. For example, $N^{2ndSCI}_{oh}$ may be an overhead related to a $2^{nd}$ SCI. For example, $N^{DMRS}_{oh}$ may be an overhead related to DMRS(s).

Then, in the third step, the UE may obtain an intermediate number of information bits ($N_{info}$). $N_{info}$ may be obtained by Equation 13.

$$N_{info}=N_{RE}\cdot R\cdot Q_m\cdot v \quad\quad\text{[Equation 13]}$$

Herein, R may be a code rate, and $Q_m$ may be a modulation order. v may be a number of layers.

Then, in the fourth step, based on a calculated $N_{info}$, the UE may determine a TBS according to the procedure shown in FIG. 11. Meanwhile, in case $N_{info}$ is equal to 3824 or less, the UE may determine the TBS based on Table 5.

Based on an embodiment of the present disclosure, for TBS determination, the length of a symbol period for a PSSCH or an overhead for a PSFCH may be configured for the UE as an average value with respect to slots in a resource pool. For example, for TBS determination, the transmitting UE may inform the receiving UE of the length of the symbol period for the PSSCH or the overhead for the PSFCH through the first SCI. Specifically, for example, the overhead for the PSFCH may include a symbol for PSFCH transmission (e.g., including AGC) and a gap symbol between PSSCH-to-PSFCH.

In the present disclosure, the length of the symbol period for the PSSCH may be referred to as the length of the symbol period related to the PSSCH, the symbol length related to the PSSCH, the length of the PSSCH symbol period, the PSSCH symbol length, etc. For example, the symbol period for the PSSCH may include N PSSCH symbols. Herein, for example, N may be a positive integer. For example, if N symbols for the PSSCH are included in one slot, the length of the symbol period for the PSSCH may be N. In the present disclosure, the overhead for the PSFCH may be referred to as an overhead related to the PSFCH, a PSFCH overhead, etc.

Based on an embodiment of the present disclosure, a pattern of PSSCH DMRS(s) may be different based on the symbol length of a PSSCH even if an information value for the DMRS indicated by the first SCI is the same. For example, in the TBS determination procedure, an overhead of DMRS(s) (hereinafter, DMRS overhead) may be an average value of overheads of DMRS(s) in a resource pool. For example, in the TBS determination procedure, the DMRS overhead may be determined based on a pattern indicated by the first SCI. For example, the DMRS overhead may be different based on the number of RBs for the PSSCH, and a more detailed description of an actual average value may be required.

Based on an embodiment of the present disclosure, the UE may transmit a beta value used to set the number of REs to which the second SCI is mapped through the first SCI. In this case, the UE may determine/calculate a TBS based on the beta value indicated by the first SCI. In this case, an upper limit value for the number of REs to which the second SCI is mapped may be configured differently based on the PSSCH symbol length and/or the PSSCH DMRS overhead and/or PT-RS(s). For example, the PSSCH symbol length may be the length of a PSSCH symbol period derived from a PSFCH overhead indicated by the first SCI. For example, the PSSCH symbol length may be a value excluding the PSFCH overhead from a SL symbol length related to a SL BWP. For example, the PSFCH overhead may be determined based on a period of a PSFCH resource. For example, if the period of the PSFCH resource is 0, the PSFCH overhead may be 0 symbols. For example, if the period of the PSFCH resource is 1, the PSFCH overhead may be 3 symbols.

Figure 12:
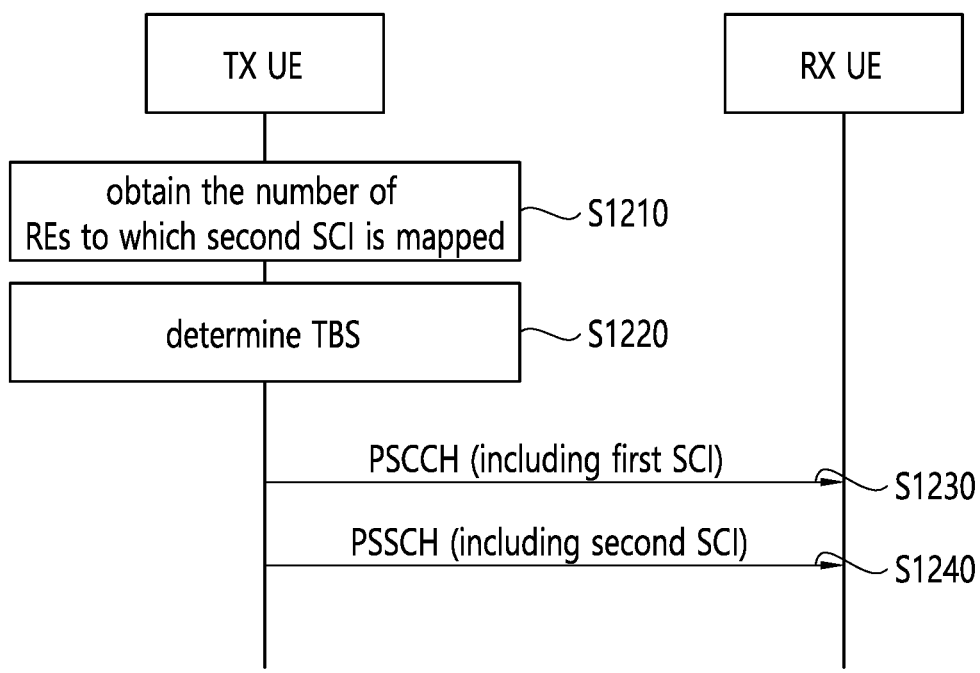
FIG. 12 shows a procedure in which a transmitting UE transmits a PSCCH and/or a PSSCH, based on an embodiment of the present disclosure.

FIG. 12 shows a procedure in which a transmitting UE transmits a PSCCH and/or a PSSCH, based on an embodiment of the present disclosure. The embodiment of FIG. 12 may be combined with various embodiments of the present disclosure.

Referring to FIG. 12, in step S1210, the transmitting UE may obtain the number of REs to which the second SCI is mapped. For example, the transmitting UE may obtain the number of REs to which the second SCI is mapped based on Table 6.

TABLE 6

For $2^{nd}$-stage SCI transmission on PSSCH with SL-SCH, the number of coded modulation symbols generated for $2^{nd}$-stage SCI transmission prior to duplication for the $2^{nd}$ layer if present, denoted as $Q_{SCI2}'$, is determined as follows:

$$Q_{SCI2}'=\min\left\{\left\lceil\frac{(O_{SCI2}+L_{SCI2})\cdot\beta_{offset}^{SCI2}}{Q_m^{SCI2}\cdot R}\right\rceil,\left\lceil\alpha\sum_{l=0}^{N_{symbol}^{PSSCH}-1}M_{sc}^{SCI2}(l)\right\rceil\right\}+\gamma$$

TABLE 6-continued where
$O_{SCI2}$ is the number of the 2$^{nd}$-stage SCI bits
$L_{SCI2}$ is the number of CRC bits for the 2$^{nd}$-stage SCI, which is 24 bits.
$\beta_{offset}^{SCI2}$ is indicated in the corresponding 1$^{st}$-stage SCI.
$M_{sc}^{PSSCH}(l)$ is the scheduled bandwidth of PSSCH transmission, expressed as a number of subcarriers.
$M_{sc}^{PSCCH}(l)$ is the number of subcarriers in OFDM symbol l that carry PSCCH and PSCCH DMRS associated with the PSSCH transmission.
$M_{sc}^{SCI2}(l)$ is the number of resource elements that can be used for transmission of the 2$^{nd}$-stage SCI in OFDM symbol l, for $l = 0, 1, 2 \cdots, N_{symbol}^{PSSCH} - 1$ and for $N_{symbol}^{PSSCH} = N_{symb}^{sh} - N_{symb}^{PSFCH}$, in PSSCH transmission. where $N_{symb}^{sh} =$ sl-lengthSymbols − 2, where sl-lengthSymbols is the number of sidelink symbols within the slot provided by higher layers. If higher layer parameter sl-PSFCH-Period = 2 or 4, $N_{symb}^{PSFCH} =$ if "PSFCH overhead indication" field of SCI format 1-A indicates "1", and $N_{symb}^{PSFCH} = 0$ otherwise. If higher layer parameter sl-PSFCH-Period = 0, $N_{symb}^{PSFCH} = 0$. if higher layer parameter sl-PSFCH-Period is 1, $N_{symb}^{PSFCH} = 3$.
$M_{sc}^{SCI2}(l) = M_{sc}^{PSSCH}(l) - M_{sc}^{PSCCH}(l)$
γ is the number of vacant resource elements in the resource block to which the last coded symbol of the 2$^{nd}$-stage SCI. belongs.
R is the coding rate as indicated by "Modulation and coding scheme" field in SCI format 1-A
α is configured by higher layer parameter sl-Scaling.

The input bit sequence to rate matching is $d_0, d_1, d_2, d_3, \cdots, d_{N-1}$, where N is the number of coded bits.
Rate matching is performed by setting $I_{BIL} = 1$.
The output bit sequence after rate matching is denoted as $g_0^{SCI2}, g_1^{SCI2}, g_2^{SCI2}, g_3^{SCI2}, \cdots, g_{G^{SCI2}-1}^{SCI2}$, where $G^{SCI2} = Q_{SCI2} \cdot Q_m^{SCI2}$ and $Q_m^{SCI2}$ is modulation order of the 2$^{nd}$-stage SCI. A UE is not expected to have $G^{SCI2} > 4096$.

Referring to Table 6, the transmitting UE may obtain the number of REs to which the second SCI is mapped based on the number of bits of the second SCI, the number of CRC bits for the second SCI, the beta offset, the PSSCH symbol length, etc.

In step S1220, the transmitting UE may determine a TBS. In step S1230, the transmitting UE may transmit the first SCI through a PSCCH. In step S1240, the transmitting UE may transmit the second SCI and/or data (e.g., MAC PDU or TB) through a PSSCH related to the PSCCH. Additionally, for example, the receiving UE may obtain/determine the number of REs to which the second SCI is mapped and/or the TBS, based on the first SCI.

Hereinafter, based on various embodiments of the present disclosure, a method for the UE to obtain the number of REs to which the second SCI is mapped and an apparatus supporting the same will be described in detail. In addition, a method for the UE to determine a TBS and an apparatus supporting the same will be described in detail.

1. Case 1 in which the Length of a Symbol Period for a PSSCH or an Overhead for a PSFCH Used by the UE for TBS Determination is Configured for the UE as an Average Value with Respect to Slots in a Resource Pool For example, the overhead for the PSFCH may be determined based on a period of a PSFCH resource. For example, if the period of the PSFCH resource is 0, the PSFCH overhead may be 0 symbols. For example, if the period of the PSFCH resource is 1, the PSFCH overhead may be 3 symbols. For example, if the period of the PSFCH resource is 2, the PSFCH overhead may be 3/2 symbols. For example, if the period of the PSFCH resource is 4, the PSFCH overhead may be 3/4 symbols.

In this case, the PSSCH symbol length used by the UE for TBS determination may be a value obtained by subtracting the PSFCH overhead from a SL symbol period length configured in a SL BWP.

1-1. TBS Determination by Considering a PSSCH DMRS Overhead 1-1-1. Case 1-A in which a PSSCH DMRS Overhead for TBS Determination is an Average Value in a Resource Pool For example, the UE may calculate the average value of PSSCH DMRS overheads differently for each number of subchannels allocated for the PSSCH. That is, the UE may calculate the average value of PSSCH DMRS overheads for DMRS pattern(s) possible for each number of subchannels allocated for the PSSCH. In this case, as the number of subchannels allocated for the PSSCH is changed, the average value of PSSCH DMRS overheads used by the UE for TBS determination may also be (automatically) changed.

For example, based on PSSCH DMRS pattern information that can be indicated by the first SCI, the UE may determine possible DMRS pattern(s). Herein, the UE may obtain/derive an average value of PSSCH DMRS overheads for possible DMRS patterns.

For example, for calculating the average value, the length of a PSSCH symbol period used/assumed by the UE when calculating PSSCH DMRS overheads may be as follows.
1) the longest PSSCH symbol length in the resource pool (in this case, the UE assumes no PSFCH overhead), or
2) the shortest PSSCH symbol length in the resource pool (in this case, the UE assumes that there is always PSFCH overhead), or
3) the length of the PSSCH symbol period obtained by excluding the rounded-up value of the average PSFCH overhead value, or
4) the length of the PSSCH symbol period obtained by excluding the rounded-off value of the average PSFCH overhead value, or
5) the length of the PSSCH symbol period obtained by excluding the rounded-down value of the average PSFCH overhead value, or
6) after generating a DMRS pattern for the length of each PSSCH symbol period for each slot in the resource pool (e.g., based on the period of the PSFCH resource, PSFCH overhead may exist or may not exist), the average value by using this pattern For example, synthetically, the UE may calculate an average value of DMRS overheads for each length of different PSSCH symbol periods and/or for each different DMRS pattern that can be indicated by the first SCI and/or for each number of subchannels allocated for different PSSCHs, and the UE may calculate a TBS by using the average value as the DMRS overhead.

1-1-2. Case 1-B in which a PSSCH DMRS Overhead for TBS Determination is Based on DMRS Pattern Information Indicated by the First SCI For example, the length of a PSSCH symbol period used/assumed by the UE when calculating the DMRS overhead value for TBS determination may be as follows.
1) the longest PSSCH symbol length in the resource pool (in this case, the UE assumes no PSFCH overhead), or
2) the shortest PSSCH symbol length in the resource pool (in this case, the UE assumes that there is always PSFCH overhead), or
3) the length of the PSSCH symbol period obtained by excluding the rounded-up value of the average PSFCH overhead value, or
4) the length of the PSSCH symbol period obtained by excluding the rounded-off value of the average PSFCH overhead value, or
5) the length of the PSSCH symbol period obtained by excluding the rounded-down value of the average PSFCH overhead value, or
6) after generating a DMRS pattern indicated by the first SCI for the length of each PSSCH symbol period for each slot in the resource pool (e.g., based on the period of the PSFCH resource, PSFCH overhead may exist or may not exist), the average value by using this pattern For example, synthetically, the UE may calculate an average value of DMRS overheads, by using the DMRS pattern indicated by the first SCI, for each length of different PSSCH symbol periods and/or for each number of subchannels allocated for different PSSCHs, and the UE may calculate a TBS by using the average value as the DMRS overhead. Specifically, for example, the average value may be configured for each number of subchannels/PRBs allocated for the PSSCH.

1-2. TBS Determination by Considering a Second SCI Overhead

For example, an upper limit value for the number of REs to which the second SCI is mapped is a value obtained by excluding at least one of a PSCCH overhead, a PSSCH DMRS overhead, a PT-RS overhead and/or a CSI-RS overhead from the number of REs for a PSSCH. For example, if the UE calculates the number of REs for the PSSCH, the length of a PSSCH symbol period may be as follows.
1) the longest PSSCH symbol length in the resource pool (in this case, the UE assumes no PSFCH overhead), or
2) the shortest PSSCH symbol length in the resource pool (in this case, the UE assumes that there is always PSFCH overhead), or
3) the length of the PSSCH symbol period obtained by excluding the rounded-up value of the average PSFCH overhead value, or
4) the length of the PSSCH symbol period obtained by excluding the rounded-off value of the average PSFCH overhead value, or
5) the length of the PSSCH symbol period obtained by excluding the rounded-down value of the average PSFCH overhead value, or
6) the length of the PSSCH symbol period obtained by excluding the average PSFCH overhead value (in this case, the average PSFCH overhead value may not be an integer value)

Based on each assumption, if the UE calculates an upper limit value for the number of REs to which the second SCI is mapped, DMRS overheads and/or PT-RS overheads may be different. For example, the UE may obtain DMRS overheads and/or PT-RS overheads for each PSSCH symbol period with a different length, and the UE may obtain an average value of the DMRS overheads and/or the PT-RS overheads. In addition, the UE may calculate/obtain the upper limit value for the number of REs to which the second SCI is mapped, by using the average value of the DMRS overheads and/or the PT-RS overheads. For example, the average value of the DMRS overheads and/or the PT-RS overheads may be calculated differently for each number of subchannels allocated for the PSSCH.

1-3. TBS Determination by Considering a SL CSI-RS Overhead and/or a PT-RS Overhead For example, based on the length of a PSSCH symbol period, whether a CSI-RS and/or a PT-RS is mapped may be different. For example, the CSI-RS overhead and/or the PT-RS overhead may be different based on the length of the PSSCH symbol period. For example, the length of the PSSCH symbol period assumed by the UE may be as follows.
1) the longest PSSCH symbol length in the resource pool (in this case, the UE assumes no PSFCH overhead), or
2) the shortest PSSCH symbol length in the resource pool (in this case, the UE assumes that there is always PSFCH overhead), or
3) the length of the PSSCH symbol period obtained by excluding the rounded-up value of the average PSFCH overhead value, or
4) the length of the PSSCH symbol period obtained by excluding the rounded-off value of the average PSFCH overhead value, or
5) the length of the PSSCH symbol period obtained by excluding the rounded-down value of the average PSFCH overhead value, or
6) the length of the PSSCH symbol period obtained by excluding the average PSFCH overhead value (in this case, the average PSFCH overhead value may not be an integer value)

For example, with respect to the CSI-RS and/or the PT-RS, the UE may determine/calculate a TBS by using information indicated by the first SCI (e.g., the number of allocated PRBs and/or MCS) and/or an overhead value derived by the length of a reference PSSCH symbol period. For example, with respect to the CSI-RS and/or the PT-RS, the UE may determine/calculate a TBS, by using an average value of overhead values that can be derived for each number of PRBs/subchannels allocated for the PSSCH and/or the length of the PSSCH symbol period available in a resource pool and/or information that can be indicated by the first SCI.

2. Case 2: The length of a symbol period for a PSSCH or an overhead for a PSFCH used by the UE for TBS determination may be indicated by the first SCI and/or the second SCI. For example, the transmitting UE may transmit information related to the length of the symbol period for the PSSCH used for TBS determination or the overhead for the PSFCH through the first SCI.

2-1. TBS Determination by Considering a PSSCH DMRS Overhead 2-1-1. Case 2-A in which a PSSCH DMRS Overhead for TBS Determination is an Average Value in a Resource Pool For example, the UE may calculate the average value of PSSCH DMRS overheads differently for each number of subchannels allocated for the PSSCH. That is, the UE may calculate the average value of PSSCH DMRS overheads for DMRS pattern(s) possible for each number of subchannels allocated for the PSSCH. In this case, as the number of subchannels allocated for the PSSCH is changed, the average value of PSSCH DMRS overheads used by the UE for TBS determination may also be (automatically) changed.

For example, based on PSSCH DMRS pattern information that can be indicated by the first SCI, the UE may determine possible DMRS pattern(s). Herein, the UE may obtain/derive an average value of PSSCH DMRS overheads for possible DMRS patterns.

For example, for calculating the average value, the length of a PSSCH symbol period used/assumed by the UE when calculating PSSCH DMRS overheads may be as follows.
1) the longest PSSCH symbol length in the resource pool (in this case, the UE assumes no PSFCH overhead), or
2) the shortest PSSCH symbol length in the resource pool (in this case, the UE assumes that there is always PSFCH overhead), or
3) the length of the PSSCH symbol period indicated by the first SCI and/or the second SCI, or
4) after generating a DMRS pattern for the length of each PSSCH symbol period for each slot in the resource pool (e.g., based on the period of the PSFCH resource, PSFCH overhead may exist or may not exist), the average value by using this pattern For example, synthetically, the UE may calculate an average value of DMRS overheads for each length of different PSSCH symbol periods and/or for each length of the PSSCH symbol period derived from information included in the first SCI and/or for each different DMRS pattern that can be indicated by the first SCI and/or for each number of subchannels allocated for different PSSCHs, and the UE may calculate a TBS by using the average value as the DMRS overhead. Specifically, for example, the average value may be configured for each number of subchannels/PRBs allocated for the PSSCH.

2-1-2. Case 2-B in which a PSSCH DMRS Overhead for TBS Determination is Based on DMRS Pattern Information Indicated by the First SCI For example, the length of a PSSCH symbol period used/assumed by the UE when calculating the DMRS overhead value for TBS determination may be as follows.
1) the longest PSSCH symbol length in the resource pool (in this case, the UE assumes no PSFCH overhead), or
2) the shortest PSSCH symbol length in the resource pool (in this case, the UE assumes that there is always PSFCH overhead), or
3) the length of the PSSCH symbol period indicated by the first SCI or the length of the PSSCH symbol period derived from the PSFCH overhead indicated by the first SCI, or
4) after generating a DMRS pattern indicated by the first SCI for the length of each PSSCH symbol period for each slot in the resource pool (e.g., based on the period of the PSFCH resource, PSFCH overhead may exist or may not exist), the average value by using this pattern For example, synthetically, the UE may calculate an average value of DMRS overheads, by using the DMRS pattern indicated by the first SCI, for each length of different PSSCH symbol periods and/or for each length of the PSSCH symbol period derived from information included in the first SCI and/or for each number of subchannels allocated for different PSSCHs, and the UE may calculate a TBS by using the average value as the DMRS overhead. Specifically, for example, the average value may be configured for each number of subchannels/PRBs allocated for the PSSCH.

2-2. TBS Determination by Considering a Second SCI Overhead

For example, an upper limit value for the number of REs to which the second SCI is mapped is a value obtained by excluding at least one of a PSCCH overhead, a PSSCH DMRS overhead, a PT-RS overhead and/or a CSI-RS overhead from the number of REs for a PSSCH. For example, if the UE calculates the number of REs for the PSSCH, the length of a PSSCH symbol period may be as follows.
1) the longest PSSCH symbol length in the resource pool (in this case, PSFCH overhead is not assumed),
2) the shortest PSSCH symbol length in the resource pool (in this case, PSFCH overhead is always assumed),
3) the length of the PSSCH symbol period indicated by the first SCI (or the length of the PSSCH symbol period derived from the PSFCH overhead indicated by the first SCI).
4) the (pre-)configured length of the PSSCH symbol period For example, the length of the PSSCH symbol period may be configured differently or independently for the UE for each resource pool. For example, the length of the PSSCH symbol period may be configured differently or independently for the UE for each service type. For example, the length of the PSSCH symbol period may be configured differently or independently for the UE for each priority value. For example, the length of the PSSCH symbol period may be configured differently or independently for the UE for each cast type. For example, the length of the PSSCH symbol period may be configured differently or independently for the UE for each number of layers for the PSSCH. For example, the length of the PSSCH symbol period may be configured differently or independently for the UE for each speed of the UE. For example, the length of the PSSCH symbol period may be configured differently or independently for the UE for each velocity of the UE. For example, the length of the PSSCH symbol period may be configured differently or independently for the UE for each congestion control level. For example, the length of the PSSCH symbol period may be configured differently or independently for the UE for each second SCI format. For example, the length of the PSSCH symbol period may be configured differently or independently for the UE for each coding rate for the PSSCH. For example, the coding rate for the PSSCH may be indicated by an MCS. For example, the length of the PSSCH symbol period may be configured differently or independently for the UE for each spectral efficiency of the PSSCH. For example, the spectral efficiency for the PSSCH may be the coding rate and modulation scheme indicated by the MCS. For example, the length of the PSSCH symbol period may be configured differently or independently for the UE for each MCS table. For example, the MCS table may be indicated by the first SCI.

Meanwhile, the location of symbol(s) to which the second SCI is mapped may not be the first symbol of the corresponding PSSCH. In this case, the number of REs used to calculate an upper limit for the number of REs to which the second SCI is mapped is calculated/obtained based on the number of REs from the first symbol to the specific end symbol to which the second SCI is mapped. For example, if the second SCI mapping starts from the first DMRS symbol in the PSSCH resource, the number of REs before the symbol may not be included in the number of REs for the upper limit value for the number of REs to which the second SCI is mapped.

Meanwhile, the number of REs for the second SCI may be adjusted based on a beta offset value indicated by the first SCI. For example, candidate value(s) of the beta offset that can be indicated by the first SCI may be configured differently or independently for the UE for each resource pool. For example, candidate value(s) of the beta offset that can be indicated by the first SCI may be configured differently or independently for the UE for each service type. For example, candidate value(s) of the beta offset that can be indicated by the first SCI may be configured differently or independently for the UE for each priority value. For example, candidate value(s) of the beta offset that can be indicated by the first SCI may be configured differently or independently for the UE for each cast type. For example, candidate value(s) of the beta offset that can be indicated by the first SCI may be configured differently or independently for the UE for each number of layers for the PSSCH. For example, candidate value(s) of the beta offset that can be indicated by the first SCI may be configured differently or independently for the UE for each speed of the UE. For example, candidate value(s) of the beta offset that can be indicated by the first SCI may be configured differently or independently for the UE for each velocity of the UE. For example, candidate value(s) of the beta offset that can be indicated by the first SCI may be configured differently or independently for the UE for each congestion control level. For example, candidate value(s) of the beta offset that can be indicated by the first SCI may be configured differently or independently for the UE for each second SCI format. For example, the beta offset value may be different based on the second SCI format indicated by the first SC. For example, candidate value(s) of the beta offset that can be indicated by the first SCI may be configured differently or independently for the UE for each coding rate for the PSSCH. For example, the coding rate for the PSSCH may be indicated by an MCS. For example, candidate value(s) of the beta offset that can be indicated by the first SCI may be configured differently or independently for the UE for each spectral efficiency for the PSSCH. For example, the spectral efficiency for the PSSCH may be the coding rate and modulation scheme indicated by the MCS. For example, candidate value(s) of the beta offset that can be indicated by the first SCI may be configured differently or independently for the UE for each length of a symbol period for PSSCH transmission. For example, the length of the symbol period for PSSCH transmission may be the actual length of the symbol period for PSSCH transmission. For example, the length of the symbol period for PSSCH transmission may be a value (e.g., length) indicated by a SCI. For example, candidate value(s) of the beta offset that can be indicated by the first SCI may be configured differently or independently for the UE for each MCS table. For example, the MCS table may be indicated by the first SCI. For example, the beta offset value used by the UE to calculate the number of REs for the second SCI may be a value obtained by dividing the number of layers for the PSSCH from the beta offset value indicated by the first SCI. For example, the beta offset value used by the UE to calculate the number of REs for the second SCI may be a value obtained by dividing a specific (pre-)configured value corresponding to the number of layers for the PSSCH (e.g., the corresponding value is configured for each number of layers) from the beta offset value indicated by the first SCI. For example, the beta offset value used by the UE to calculate the number of REs for the second SCI may be a value corresponding to the divided value (e.g., a rounded-up value, a rounded-off value, a rounded-down value, a quantized value). For example, an embodiment of the beta value may be applied to an alpha value (e.g., a scaling value applied to an upper limit value of the number of REs for the second SCI).

Meanwhile, the UE may map the second SCI from the start symbol to the last symbol of the PSSCH. Nevertheless, additional resources for the second SCI may be required. In the above situation, the UE may map the second SCI in the reverse order from a symbol before the start symbol in a time domain and/or a frequency domain and/or a layer domain. For example, whether the above method is applied or not may be different based on the start symbol to which the second SCI is mapped. For example, whether the above method is applied or not may be different based on the length of a symbol period for PSSCH transmission (e.g., an actual length or a value indicated by a SCI). For example, whether the above method is applied or not may be different based on a PSSCH DMRS pattern. For example, whether the above method is applied or not may be different based on an MCS table. For example, the MCS table may be indicated by the first SCI.

Based on each assumption, if the UE calculates an upper limit value for the number of REs to which the second SCI is mapped, DMRS overheads and/or PT-RS overheads may be different.

For example, the UE may assume/determine the parameter/information used for TBS calculation as an overhead for a CSI-RS and/or a PT-RS, and the UE may calculate an upper limit value for the number of REs to which the second SCI is mapped by using the parameter/information. For example, the parameter/information may be a higher layer parameter. For example, the parameter/information may be configured or pre-configured for the UE for each resource pool or for each SL BWP. For example, the base station/network may transmit the parameter/information for each resource pool or for each SL BWP to the UE. For example, the parameter/information may be sl-xOverhead.

Specifically, for example, the parameter/information may be different based on a PSFCH overhead value indicated by a SCI by the UE. For example, the parameter/information may be configured or pre-configured for the UE for each PSFCH overhead value. For example, the base station/network may transmit the parameter/information for each PSFCH overhead value to the UE.

For example, the UE may assume/determine a reference overhead used for TBS calculation as a DMRS overhead, and the UE may calculate an upper limit value for the number of REs to which the second SCI is mapped by using the reference overhead. For example, the reference overhead may be related to a DMRS pattern (e.g., sl-PSSCH-DMRS-TimePattern) (pre-)configured for the UE. For example, the reference overhead may be $N^{DMRS}_{RE}$. For example, $N^{DMRS}_{RE}$ may be the number of REs to which DMRS(s) is mapped within one PRB. For example, the UE may determine the reference overhead based on a (pre-)configured DMRS pattern, and the UE may calculate an upper limit value for the number of REs to which the second SCI is mapped by using the reference overhead. For example, the relationship between the DMRS pattern and the reference overhead may be expressed as shown in Table 7.

TABLE 7

| sl-PSSCH-DMRS-TimePattern | $N^{DMRS}_{RE}$ |
| --- | --- |
| {2} | 12 |
| {3} | 18 |
| {4} | 24 |
| {2,3} | 15 |
| {2,4} | 18 |
| {3,4} | 21 |
| {2,3,4} | 18 |

For example, since the DMRS pattern may be changed based on the number of subchannels configured for the UE, the reference overhead may be an average value of DMRS overheads for the (pre-)configured DMRS pattern for each number of subchannels. For example, since the DMRS pattern may be changed based on the number of PRBs configured for the UE, the reference overhead may be an average value of DMRS overheads for the (pre-)configured DMRS pattern for each number of PRBs. For example, since the DMRS pattern may be changed based on the length of a PSSCH symbol period, the reference overhead may be an average value of DMRS overheads for the (pre-)configured DMRS pattern for each length of the PSSCH symbol period. For example, since the DMRS pattern may be changed based on a PSFCH overhead, the reference overhead may be an average value of DMRS overheads for the (pre-)configured DMRS pattern for each PSFCH overhead. For example, if the UE calculates/obtains the average value of the DMRS overheads, some of the parameters described above (e.g., the number of subchannels, the number of PRBs, the length of the PSSCH symbol period and/or the PSFCH overhead) may be fixed. For example, while the PSFCH overhead is fixed to a value indicated by a SCI, the reference overhead may be an average value of DMRS overheads for the (pre-)configured DMRS pattern. For example, while the number of subchannels is fixed to the number of PSSCHs through which the second SCI is transmitted, the reference overhead may be an average value of DMRS overheads for the (pre-)configured DMRS pattern.

For example, in the case of an upper limit value for the second SCI, i) an upper limit value for the number of REs to which the second SCI is actually mapped and ii) an upper limit value for the second SCI used/referenced by the UE to calculate/obtain a TBS may be different. For example, the upper limit value for the number of REs to which the second SCI is actually mapped may be a value obtained by excluding an AGC symbol and/or a symbol related to TX-RX switching and/or an actual PSCCH overhead and/or an actual PSSCH DMRS overhead and/or a PSFCH symbol overhead indicated by the first SCI and/or an actual sidelink PT-RS overhead from the amount of available resources in a SL slot (e.g., a value obtained by multiplying the number of SL symbols in the SL slot and the number of subcarriers allocated for the PSSCH). On the other hand, the upper limit value for the second SCI used/referenced by the UE to calculate/obtain the TBS may be a value obtained by excluding an AGC symbol and/or a symbol related to TX-RX switching and/or an actual PSCCH overhead and/or a reference PSSCH DMRS overhead referenced in TBS calculation and/or a PSFCH symbol overhead indicated by the first SCI and/or a reference sidelink PT-RS overhead referenced in TBS calculation from the amount of available resources in a SL slot (e.g., a value obtained by multiplying the number of SL symbols in the SL slot and the number of subcarriers allocated for the PSSCH).

For example, in the case of an upper limit value for the second SCI, i) an upper limit value for the number of REs to which the second SCI is actually mapped and ii) an upper limit value for the second SCI used/referenced by the UE to calculate/obtain a TBS may (always) be the same.

Meanwhile, in order to perform multiplexing for the second SCI and the PSSCH in units of an RB, the UE may map the second SCI by additionally applying an offset value of a specific number of REs (hereinafter, an offset value of the number of REs). Meanwhile, based on PSSCH DMRS(s) and/or PT-RS(s) in the region to which the second SCI is mapped, the offset value of the number of REs may be changed between transmissions of the UE. For this reason, it may be difficult for the UE to indicate the same TBS between initial transmission and retransmission.

For example, if the UE calculates a TBS, an offset value of the number of REs for supporting the RB unit multiplexing may be set to a specific value regardless of an actual value. For example, the UE may calculate the TBS by using the offset value of the specific number of REs independent of the actual value.

For example, the specific value may be 11. The reason why the UE calculates the TBS by using the offset value of the number of REs=11 is as follows. For example, the range of the number of REs may be from 0 to 11. Herein, if the UE calculates the TBS by using a value smaller than an offset value of the actual number of REs, a problem in which an actual coding rate is increased may occur. Due to this, there may be a problem in that the UE is limited to the use of MCS and other transmission parameters. Accordingly, in order to prevent the above-described problem, the UE may conservatively calculate the TBS by using the maximum value of the offset value of the number of REs.

For example, the offset value for the number of REs may be 6 or 7. The reason why the UE calculates the TBS by using the offset value of the number of REs=6 or 7 is as follows. For example, if the offset value of the number of REs is set to 0, a problem in which an actual coding rate is increased may occur. For example, if the offset value of the number of REs is set to 11, a problem in which an actual coding rate is decreased may occur. Therefore, in order to alleviate the problem of increasing or decreasing the actual coding rate, the UE may calculate the TBS by using the offset value of the number of REs=6 or 7.

For example, the UE may determine that the maximum value among offset values of the possible number of REs to support RB unit multiplexing between the second SCI and the PSSCH is the offset value of the number of REs, based on (pre-)configured PSSCH DMRS patterns, PT-RS patterns, and/or PSFCH overhead values in the corresponding resource pool. For example, the UE may determine that the minimum value among offset values of the possible number of REs to support RB unit multiplexing between the second SCI and the PSSCH is the offset value of the number of REs, based on (pre-)configured PSSCH DMRS patterns, PT-RS patterns, and/or PSFCH overhead values in the corresponding resource pool. For example, the UE may determine that the median value among offset values of the possible number of REs to support RB unit multiplexing between the second SCI and the PSSCH is the offset value of the number of REs, based on (pre-)configured PSSCH DMRS patterns, PT-RS patterns, and/or PSFCH overhead values in the corresponding resource pool. Additionally, for example, the UE may perform TBS calculation by using the offset value of the number of REs.

For example, the UE may mix and use an offset value of the actual number of REs and an offset value of the reference RE number. For example, the UE may calculate a TBS by using a specific MCS value and/or a coding rate value indicated by the specific MCS and/or a range of specific TBS values and/or the number of subchannels allocated for a specific PSSCH or an offset value of the specific number of REs, which may differ from the actual value in that range. For example, the offset value of the number of REs used by the UE for TBS calculation may be 0. Specifically, for example, if a value of the number of REs for the second SCI is set to an upper limit value before an offset value of the number of REs for FDM is applied, the UE may assume/determine the offset value of the number of REs used for TBS calculation as 0. In this case, the UE may calculate/ determine the TBS based on 'offset value of the number of REs=0'. For example, if a value of the number of REs for the second SCI is less than an upper limit value before an offset value of the number of REs for FDM is applied, the UE may assume/determine the offset value of the number of REs used for TBS calculation as the offset value of the actual number of REs. In this case, the UE may calculate/determine the TBS based on 'offset value of the number of REs=offset value of the actual number of REs'.

Meanwhile, an overhead value for the second SCI used by the UE for TB calculation between initial transmission and retransmission may be configured regardless of the number of REs actually occupied. In this case, the UE may determine an average value of the possible number of REs occupied by the second SCI, based on PSFCH overhead values, possible offset values of the number of REs to support RB unit multiplexing between the second SCI and the PSSCH, beta offset values (e.g., an offset for adjusting the coding rate of the second SCI and/or the amount of resources to which the second SCI is mapped), PT-RS patterns, and/or PSSCH DMRS patterns (pre-)configured in a resource pool. Additionally, for example, the UE may calculate a TBS by using the average value. For example, the value may be an average value calculated while the number of subchannels of the PSSCH is fixed. For example, the value may be the minimum value calculated while the number of subchannels of the PSSCH is fixed. For example, the value may be the maximum value calculated while the number of subchannels of the PSSCH is fixed. For example, the value may be the median value calculated while the number of subchannels of the PSSCH is fixed. For example, the overhead value for the second SCI used by the UE for TBS calculation may be the number of REs of the second SCI calculated by the UE using an average value of offset values of the possible number of REs to support RB unit multiplexing between the second SCI and the PSSCH and an average value of beta offset values configured for the resource pool. For example, the overhead value for the second SCI used by the UE for TBS calculation may be the number of REs of the second SCI calculated by the UE using an average value of offset values of the possible number of REs to support RB unit multiplexing between the second SCI and the PSSCH and a specific beta offset value (e.g., the minimum value or the maximum value) configured for the resource pool. For example, the overhead value for the second SCI used by the UE for TBS calculation may be the number of REs of the second SCI calculated by the UE using a specific offset value (e.g., the minimum value or the maximum value) of the possible number of REs to support RB unit multiplexing between the second SCI and the PSSCH and an average value of beta offset values configured for the resource pool. For example, the overhead value for the second SCI used by the UE for TBS calculation may be the number of REs of the second SCI calculated by the UE using a specific offset value (e.g., the minimum value or the maximum value) of the possible number of REs to support RB unit multiplexing between the second SCI and the PSSCH and a specific beta offset value (e.g., the minimum value or the maximum value) configured for the resource pool. For example, the offset value of the number of REs used by the UE for TBS calculation may be related to the offset value of the number of REs actually used for the second SCI mapping. For example, based on the range of the offset value of the number of REs actually used for the second SCI mapping, the UE may differently select the offset value of the number of REs used for TBS calculation.

2-3. TBS Determination by Considering a SL CSI-RS Overhead and/or a PT-RS Overhead For example, based on the length of a PSSCH symbol period, whether a CSI-RS and/or a PT-RS is mapped may be different. For example, the CSI-RS overhead and/or the PT-RS overhead may be different based on the length of the PSSCH symbol period. For example, the length of the PSSCH symbol period assumed by the UE may be as follows.

1) the longest PSSCH symbol length in the resource pool (in this case, the UE assumes no PSFCH overhead), or
2) the shortest PSSCH symbol length in the resource pool (in this case, the UE assumes that there is always PSFCH overhead), or
3) the length of the PSSCH symbol period indicated by the first SCI and/or the second SCI or the length of the PSSCH symbol period derived from the PSFCH overhead indicated by the first SCI and/or the second SCI For example, the parameter/information may be configured or pre-configured for the UE for each length of the PSSCH symbol period. For example, the base station/network may transmit the parameter/information for each length of the PSSCH symbol period to the UE. For example, the parameter/information may be configured or pre-configured for the UE for each PSFCH overhead. For example, the base station/network may transmit the parameter/information for each PSFCH overhead to the UE. For example, the parameter/information may be configured or pre-configured for the UE for each resource pool. For example, the base station/network may transmit the parameter/information for each resource pool to the UE. For example, the parameter/ information may be configured or pre-configured for the UE for each SL BWP. For example, the base station/network may transmit the parameter/information for each SL BWP to the UE. For example, the parameter/information may be sl-xOverhead. For example, based on the PSFCH overhead indicated by the transmitting UE to the receiving UE through the SCI, the receiving UE may select/determine the parameter/information (e.g., sl-xOverhead) differently.

For example, with respect to the CSI-RS and/or the PT-RS, the UE may determine/calculate a TBS by using information indicated by the first SCI (e.g., the number of allocated PRBs and/or MCS) and/or an overhead value derived by the length of a reference PSSCH symbol period. For example, with respect to the CSI-RS and/or the PT-RS, the UE may determine/calculate a TBS, by using an average value of overhead values that can be derived for each number of PRBs/subchannels allocated for the PSSCH and/ or the length of the PSSCH symbol period available in a resource pool and/or information that can be indicated by the first SCI. Specifically, for example, the average value may be configured for each number of subchannels/PRBs allocated for the PSSCH.

Meanwhile, in the mode 1 (i.e., resource allocation mode 1) operation, a range of an MCS value or an MCS value may be (pre-)configured for each resource pool. For example, in the mode 1 operation, in the case of a DG, the range of the MCS value or the MCS value may be (pre-)configured for each resource pool. For example, in the mode 1 operation, the range of the MCS value or the MCS value may be (pre-)configured for each CG resource. In this case, if a plurality of MCS tables are configured for the corresponding resource pool, an MCS limit value or region may be configured for each MCS table, or MCS table information may also be configured when configuring the MCS limit value or region.

Although the present disclosure has mainly described the embodiment of the method for calculating the overhead for calculating the TBS by the UE, the technical idea of the present disclosure is not limited thereto. An embodiment of the present disclosure may be extended to the case in which the UE calculates the number of REs to which the second SCI is actually mapped.

In the present disclosure, if the size may be different for each subchannel, an average value for each number of subchannels may be replaced with an average value for each number of PRBs. Alternatively, the UE may calculate an average value assuming all subchannels having the same size without considering subchannels having different sizes.

Figure 13:
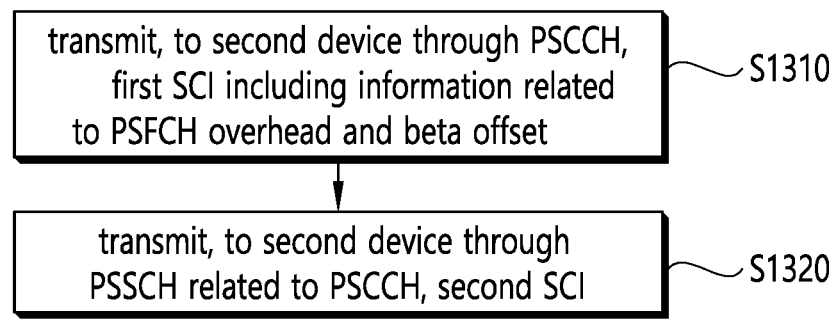
FIG. 13 shows a method for a first device to perform wireless communication, based on an embodiment of the present disclosure.

FIG. 13 shows a method for a first device to perform wireless communication, based on an embodiment of the present disclosure. The embodiment of FIG. 13 may be combined with various embodiments of the present disclosure.

Referring to FIG. 13, in step S1310, the first device may transmit, to a second device through a physical sidelink control channel (PSCCH), a first sidelink control information (SCI) including information related to a physical sidelink feedback channel (PSFCH) overhead and a beta offset. In step S1320, the first device may transmit, to the second device through a physical sidelink shared channel (PSSCH) related to the PSCCH, a second SCI. For example, a symbol length related to the PSSCH may be obtained based on the information related to the PSFCH overhead, and a number of resource elements (REs) to which the second SCI is mapped may be obtained based on the symbol length related to the PSSCH and the beta offset.

Additionally, for example, the first device may map, based on the number of REs to which the second SCI is mapped, the second SCI to a resource related to the PSSCH.

For example, the symbol length related to the PSSCH may be a value obtained by subtracting the PSFCH overhead from a sidelink (SL) symbol length. For example, the SL symbol length may be related to a SL bandwidth part (BWP) configured for the first device. For example, the PSFCH overhead may be determined based on a period of a PSFCH resource related to a resource pool. For example, based on the period of the PSFCH resource set to 0, the PSFCH overhead may be 0. For example, based on the period of the PSFCH resource set to 1, the PSFCH overhead may be 3. For example, the PSFCH overhead may be 3 based on (i) the period of the PSFCH resource set to 2 or 4, and (ii) the information related to the PSFCH overhead representing 1. For example, the PSFCH overhead may be 0 based on (i) the period of the PSFCH resource set to 2 or 4, and (ii) the information related to the PSFCH overhead representing 0.

Additionally, for example, the first device may obtain a number of REs allocated for the PSSCH, based on the symbol length related to the PSSCH and a demodulation reference signal (DMRS) overhead. For example, the first SCI may include information related to the DMRS overhead, and the DMRS overhead may be a number of REs related to a DMRS for the PSSCH.

For example, the beta offset may be selected from among a plurality of beta offsets configured for a resource pool.

For example, the number of REs to which the second SCI is mapped may be different from a number of REs related to the second SCI for transport block size (TBS) determination.

For example, a DMRS for the PSSCH may be mapped to at least one symbol on a resource related to the PSSCH, and the second SCI may be mapped from 1st symbol among the at least one symbol.

The proposed method may be applied to device(s) based on various embodiments of the present disclosure. First, the processor 102 of the first device 100 may control the transceiver 106 to transmit, to a second device through a physical sidelink control channel (PSCCH), a first sidelink control information (SCI) including information related to a physical sidelink feedback channel (PSFCH) overhead and a beta offset. In addition, the processor 102 of the first device 100 may control the transceiver 106 to transmit, to the second device through a physical sidelink shared channel (PSSCH) related to the PSCCH, a second SCI. For example, a symbol length related to the PSSCH may be obtained based on the information related to the PSFCH overhead, and a number of resource elements (REs) to which the second SCI is mapped may be obtained based on the symbol length related to the PSSCH and the beta offset.

Based on an embodiment of the present disclosure, a first device configured to perform wireless communication may be provided. For example, the first device may comprise: one or more memories storing instructions; one or more transceivers; and one or more processors connected to the one or more memories and the one or more transceivers. For example, the one or more processors may execute the instructions to: transmit, to a second device through a physical sidelink control channel (PSCCH), a first sidelink control information (SCI) including information related to a physical sidelink feedback channel (PSFCH) overhead and a beta offset; and transmit, to the second device through a physical sidelink shared channel (PSSCH) related to the PSCCH, a second SCI. For example, a symbol length related to the PSSCH may be obtained based on the information related to the PSFCH overhead, and a number of resource elements (REs) to which the second SCI is mapped may be obtained based on the symbol length related to the PSSCH and the beta offset.

Based on an embodiment of the present disclosure, an apparatus configured to control a first user equipment (UE) performing wireless communication may be provided. For example, the apparatus may comprise: one or more processors; and one or more memories operably connected to the one or more processors and storing instructions. For example, the one or more processors may execute the instructions to: transmit, to a second UE through a physical sidelink control channel (PSCCH), a first sidelink control information (SCI) including information related to a physical sidelink feedback channel (PSFCH) overhead and a beta offset; and transmit, to the second UE through a physical sidelink shared channel (PSSCH) related to the PSCCH, a second SCI. For example, a symbol length related to the PSSCH may be obtained based on the information related to the PSFCH overhead, and a number of resource elements (REs) to which the second SCI is mapped may be obtained based on the symbol length related to the PSSCH and the beta offset.

Based on an embodiment of the present disclosure, a non-transitory computer-readable storage medium storing instructions may be provided. For example, the non-transitory computer-readable storage medium storing instructions, when executed, may cause a first device to: transmit, to a second device through a physical sidelink control channel (PSCCH), a first sidelink control information (SCI) including information related to a physical sidelink feedback channel (PSFCH) overhead and a beta offset; and transmit, to the second device through a physical sidelink shared channel (PSSCH) related to the PSCCH, a second SCI. For example, a symbol length related to the PSSCH may be obtained based on the information related to the PSFCH overhead, and a number of resource elements (REs) to which the second SCI is mapped may be obtained based on the symbol length related to the PSSCH and the beta offset.

Figure 14:
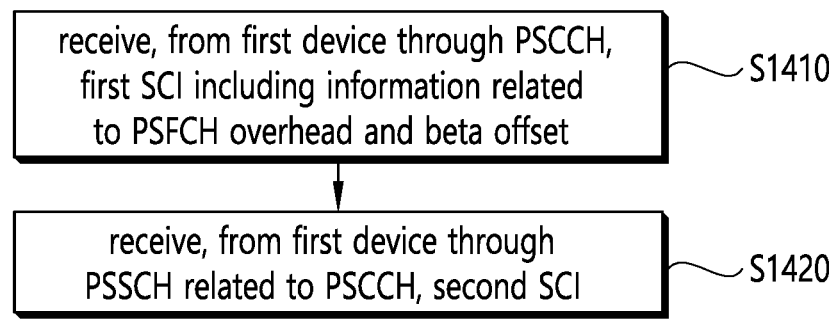
FIG. 14 shows a method for a second device to perform wireless communication, based on an embodiment of the present disclosure.

FIG. 14 shows a method for a second device to perform wireless communication, based on an embodiment of the present disclosure. The embodiment of FIG. 14 may be combined with various embodiments of the present disclosure.

Referring to FIG. 14, in step S1410, the second device may receive, from a first device through a physical sidelink control channel (PSCCH), a first sidelink control information (SCI) including information related to a physical sidelink feedback channel (PSFCH) overhead and a beta offset. In step S1420, the second device may receive, from the first device through a physical sidelink shared channel (PSSCH) related to the PSCCH, a second SCI. For example, a symbol length related to the PSSCH may be obtained based on the information related to the PSFCH overhead, and a number of resource elements (REs) to which the second SCI is mapped may be obtained based on the symbol length related to the PSSCH and the beta offset.

The proposed method may be applied to device(s) based on various embodiments of the present disclosure. First, the processor 202 of the second device 200 may control the transceiver 206 to receive, from a first device through a physical sidelink control channel (PSCCH), a first sidelink control information (SCI) including information related to a physical sidelink feedback channel (PSFCH) overhead and a beta offset. In addition, the processor 202 of the second device 200 may control the transceiver 206 to receive, from the first device through a physical sidelink shared channel (PSSCH) related to the PSCCH, a second SCI. For example, a symbol length related to the PSSCH may be obtained based on the information related to the PSFCH overhead, and a number of resource elements (REs) to which the second SCI is mapped may be obtained based on the symbol length related to the PSSCH and the beta offset.

Based on an embodiment of the present disclosure, a second device configured to perform wireless communication may be provided. For example, the second device may comprise: one or more memories storing instructions; one or more transceivers; and one or more processors connected to the one or more memories and the one or more transceivers. For example, the one or more processors may execute the instructions to: receive, from a first device through a physical sidelink control channel (PSCCH), a first sidelink control information (SCI) including information related to a physical sidelink feedback channel (PSFCH) overhead and a beta offset; and receive, from the first device through a physical sidelink shared channel (PSSCH) related to the PSCCH, a second SCI. For example, a symbol length related to the PSSCH may be obtained based on the information related to the PSFCH overhead, and a number of resource elements (REs) to which the second SCI is mapped may be obtained based on the symbol length related to the PSSCH and the beta offset.

Based on an embodiment of the present disclosure, an apparatus configured to control a second user equipment (UE) performing wireless communication may be provided. For example, the apparatus may comprise: one or more processors; and one or more memories operably connected to the one or more processors and storing instructions. For example, the one or more processors may execute the instructions to: receive, from a first UE through a physical sidelink control channel (PSCCH), a first sidelink control information (SCI) including information related to a physical sidelink feedback channel (PSFCH) overhead and a beta offset; and receive, from the first UE through a physical sidelink shared channel (PSSCH) related to the PSCCH, a second SC. For example, a symbol length related to the PSSCH may be obtained based on the information related to the PSFCH overhead, and a number of resource elements (REs) to which the second SCI is mapped may be obtained based on the symbol length related to the PSSCH and the beta offset.

Based on an embodiment of the present disclosure, a non-transitory computer-readable storage medium storing instructions may be provided. For example, the non-transitory computer-readable storage medium storing instructions, when executed, may cause a second device to: receive, from a first device through a physical sidelink control channel (PSCCH), a first sidelink control information (SCI) including information related to a physical sidelink feedback channel (PSFCH) overhead and a beta offset; and receive, from the first device through a physical sidelink shared channel (PSSCH) related to the PSCCH, a second SCI. For example, a symbol length related to the PSSCH may be obtained based on the information related to the PSFCH overhead, and a number of resource elements (REs) to which the second SCI is mapped may be obtained based on the symbol length related to the PSSCH and the beta offset.

Based on various embodiments of the present disclosure, the length of the PSSCH symbol period used to derive the upper limit of the number of REs to which the second SCI is mapped may be determined based on information related to the PSFCH overhead included in the first SCI. Through this, the upper limit of the number of REs for the second SCI mapping can be aligned equally among the same TBs transmitted by the UE. In addition, the UE can efficiently adjust the upper limit of the number of REs for the second SCI mapping through the first SCI.

Various embodiments of the present disclosure may be combined with each other.

Hereinafter, device(s) to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 15:
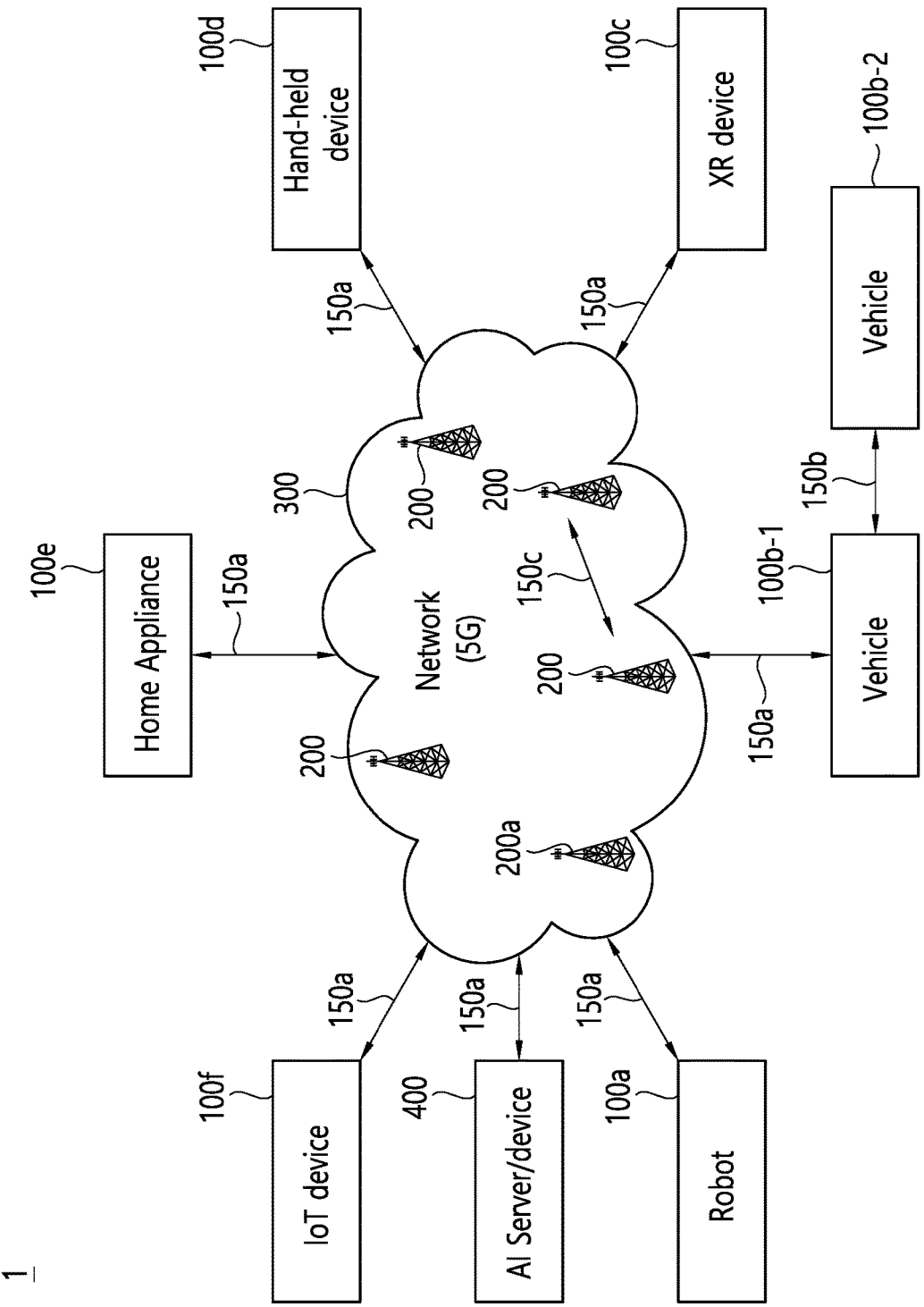
FIG. 15 shows a communication system 1, based on an embodiment of the present disclosure.

FIG. 15 shows a communication system 1, based on an embodiment of the present disclosure.

Referring to FIG. 15, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

Here, wireless communication technology implemented in wireless devices 100a to 100f of the present disclosure may include Narrowband Internet of Things for low-power communication in addition to LTE, NR, and 6G. In this case, for example, NB-IoT technology may be an example of Low Power Wide Area Network (LPWAN) technology and may be implemented as standards such as LTE Cat NB1, and/or LTE Cat NB2, and is not limited to the name described above. Additionally or alternatively, the wireless communication technology implemented in the wireless devices 100a to 100f of the present disclosure may perform communication based on LTE-M technology. In this case, as an example, the LTE-M technology may be an example of the LPWAN and may be called by various names including enhanced Machine Type Communication (eMTC), and the like. For example, the LTE-M technology may be implemented as at least any one of various standards such as 1) LTE CAT 0, 2) LTE Cat M1, 3) LTE Cat M2, 4) LTE non-Bandwidth Limited (non-BL), 5) LTE-MTC, 6) LTE Machine Type Communication, and/or 7) LTE M, and is not limited to the name described above. Additionally or alternatively, the wireless communication technology implemented in the wireless devices 100a to 100f of the present disclosure may include at least one of Bluetooth, Low Power Wide Area Network (LPWAN), and ZigBee considering the low-power communication, and is not limited to the name described above. As an example, the ZigBee technology may generate personal area networks (PAN) related to small/low-power digital communication based on various standards including IEEE 802.15.4, and the like, and may be called by various names.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 16:
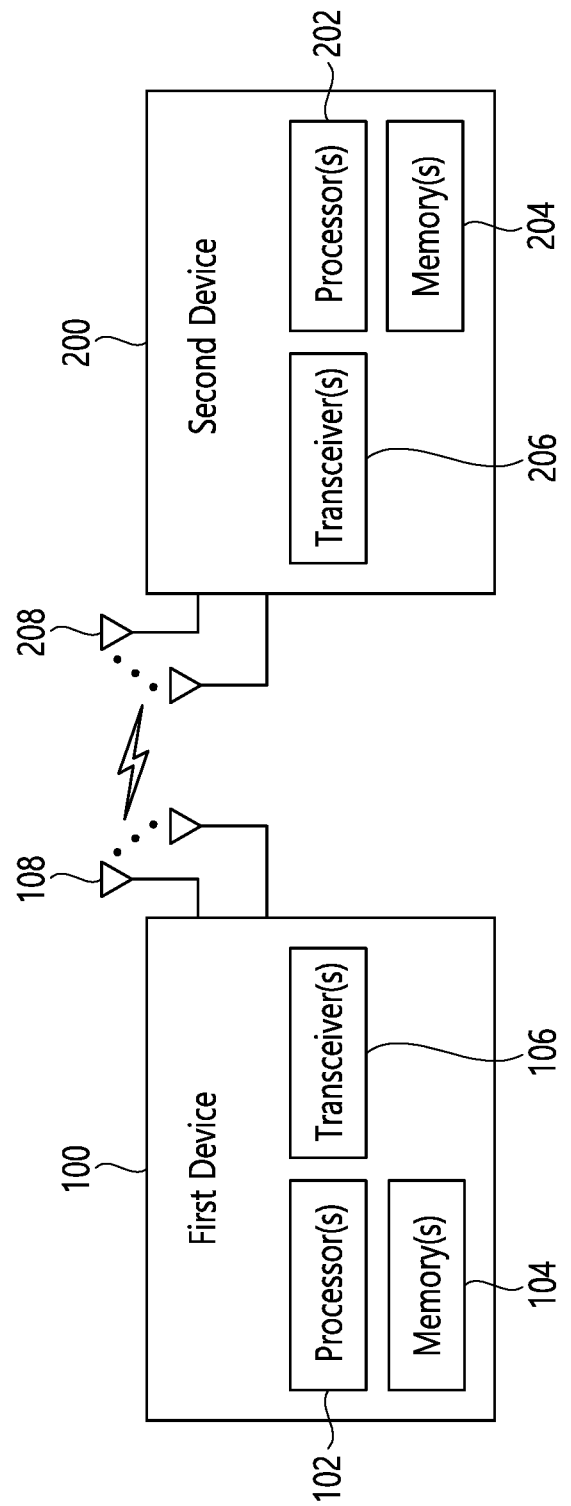
FIG. 16 shows wireless devices, based on an embodiment of the present disclosure.

FIG. 16 shows wireless devices, based on an embodiment of the present disclosure.

Referring to FIG. 16, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 15.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor (s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 17:
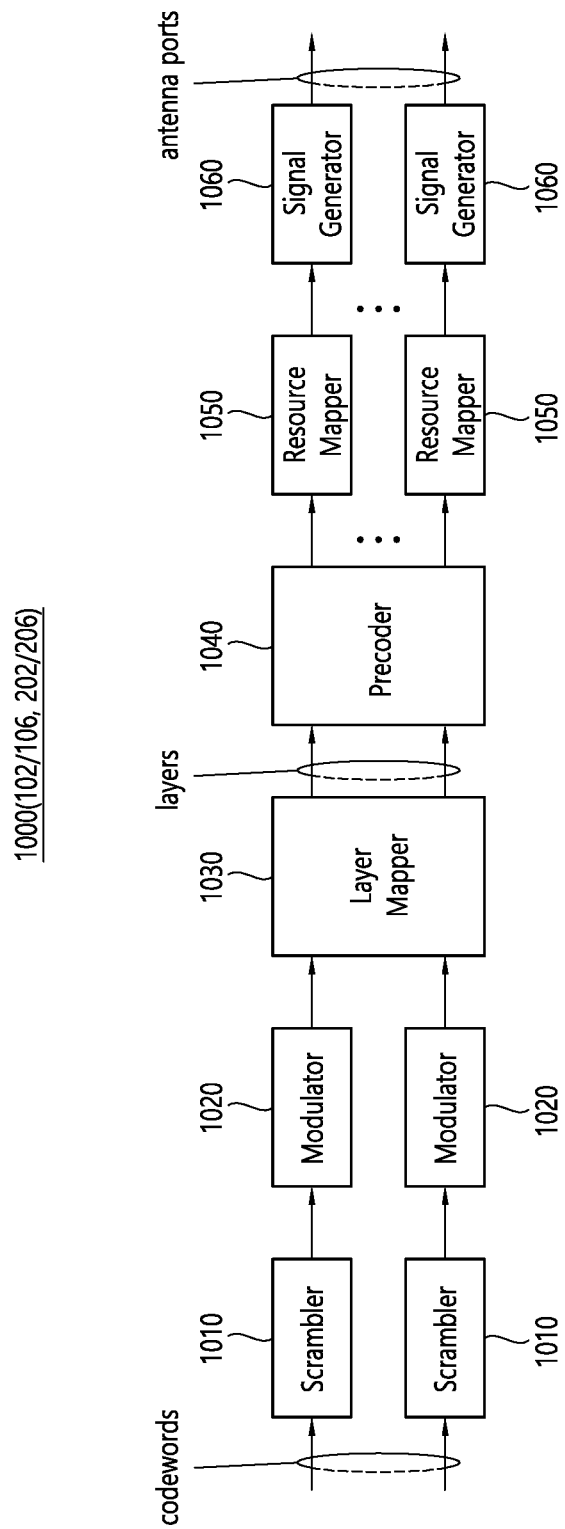
FIG. 17 shows a signal process circuit for a transmission signal, based on an embodiment of the present disclosure.

FIG. 17 shows a signal process circuit for a transmission signal, based on an embodiment of the present disclosure.

Referring to FIG. 17, a signal processing circuit 1000 may include scramblers 1010, modulators 1020, a layer mapper 1030, a precoder 1040, resource mappers 1050, and signal generators 1060. An operation/function of FIG. 17 may be performed, without being limited to, the processors 102 and 202 and/or the transceivers 106 and 206 of FIG. 16. Hardware elements of FIG. 17 may be implemented by the processors 102 and 202 and/or the transceivers 106 and 206 of FIG. 16. For example, blocks 1010 to 1060 may be implemented by the processors 102 and 202 of FIG. 16. Alternatively, the blocks 1010 to 1050 may be implemented by the processors 102 and 202 of FIG. 16 and the block 1060 may be implemented by the transceivers 106 and 206 of FIG. 16.

Codewords may be converted into radio signals via the signal processing circuit 1000 of FIG. 17. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 17. For example, the wireless devices (e.g., 100 and 200 of FIG. 16) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 18:
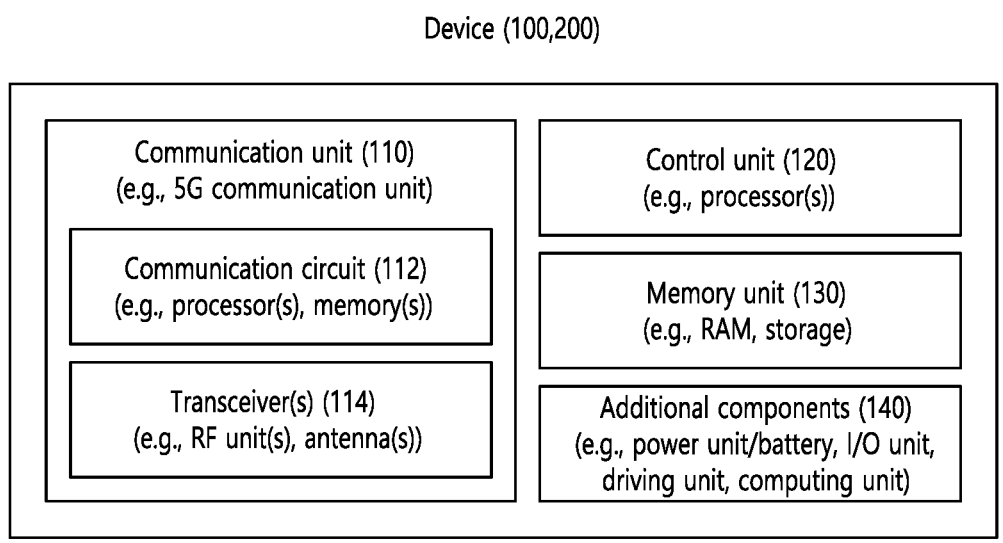
FIG. 18 shows another example of a wireless device, based on an embodiment of the present disclosure.

FIG. 18 shows another example of a wireless device, based on an embodiment of the present disclosure. The wireless device may be implemented in various forms according to a use-case/service (refer to FIG. 15).

Referring to FIG. 18, wireless devices 100 and 200 may correspond to the wireless devices 100 and 200 of FIG. 16 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 16. For example, the transceiver(s) 114 may include the one or more transceivers 106 and 206 and/or the one or more antennas 108 and 208 of FIG. 16. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 15), the vehicles (100b-1 and 100b-2 of FIG. 15), the XR device (100c of FIG. 15), the hand-held device (100d of FIG. 15), the home appliance (100e of FIG. 15), the IoT device (100f of FIG. 15), a digital broadcast terminal, a hologram device, a public safety device, an MTC device, a medicine device, a fintech device (or a finance device), a security device, a climate/environment device, the AI server/device (400 of FIG. 15), the BSs (200 of FIG. 15), a network node, etc. The wireless device may be used in a mobile or fixed place according to a use-example/service.

In FIG. 18, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 18 will be described in detail with reference to the drawings.

Figure 19:
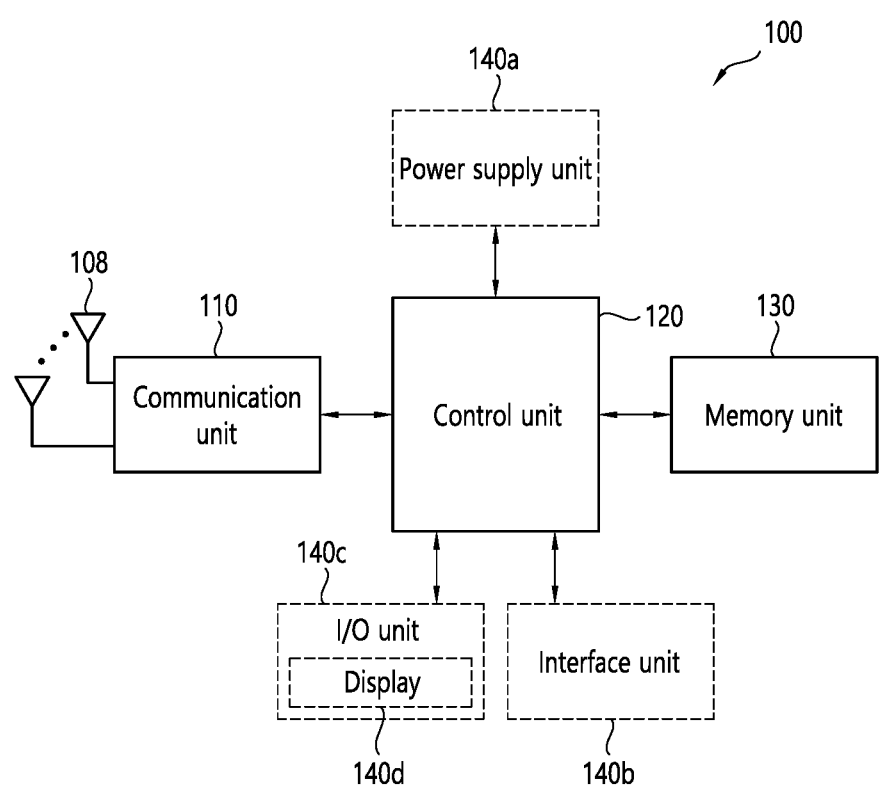
FIG. 19 shows a hand-held device, based on an embodiment of the present disclosure.

FIG. 19 shows a hand-held device, based on an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 19, a hand-held device 100 may include an antenna unit 108, a communication unit 110, a control unit 120, a memory unit 130, a power supply unit 140*a*, an interface unit 140*b*, and an I/O unit 140*c*. The antenna unit 108 may be configured as a part of the communication unit 110. Blocks 110 to 130/140*a* to 140*c* correspond to the blocks 110 to 130/140 of FIG. 18, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140*a* may supply power to the hand-held device 100 and include a wired/wireless charging circuit, a battery, etc. The interface unit 140*b* may support connection of the hand-held device 100 to other external devices. The interface unit 140*b* may include various ports (e.g., an audio I/O port and a video I/O port) for connection with external devices. The I/O unit 140*c* may input or output video information/signals, audio information/signals, data, and/or information input by a user. The I/O unit 140*c* may include a camera, a microphone, a user input unit, a display unit 140*d*, a speaker, and/or a haptic module.

As an example, in the case of data communication, the I/O unit 140*c* may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140*c*.

Figure 20:
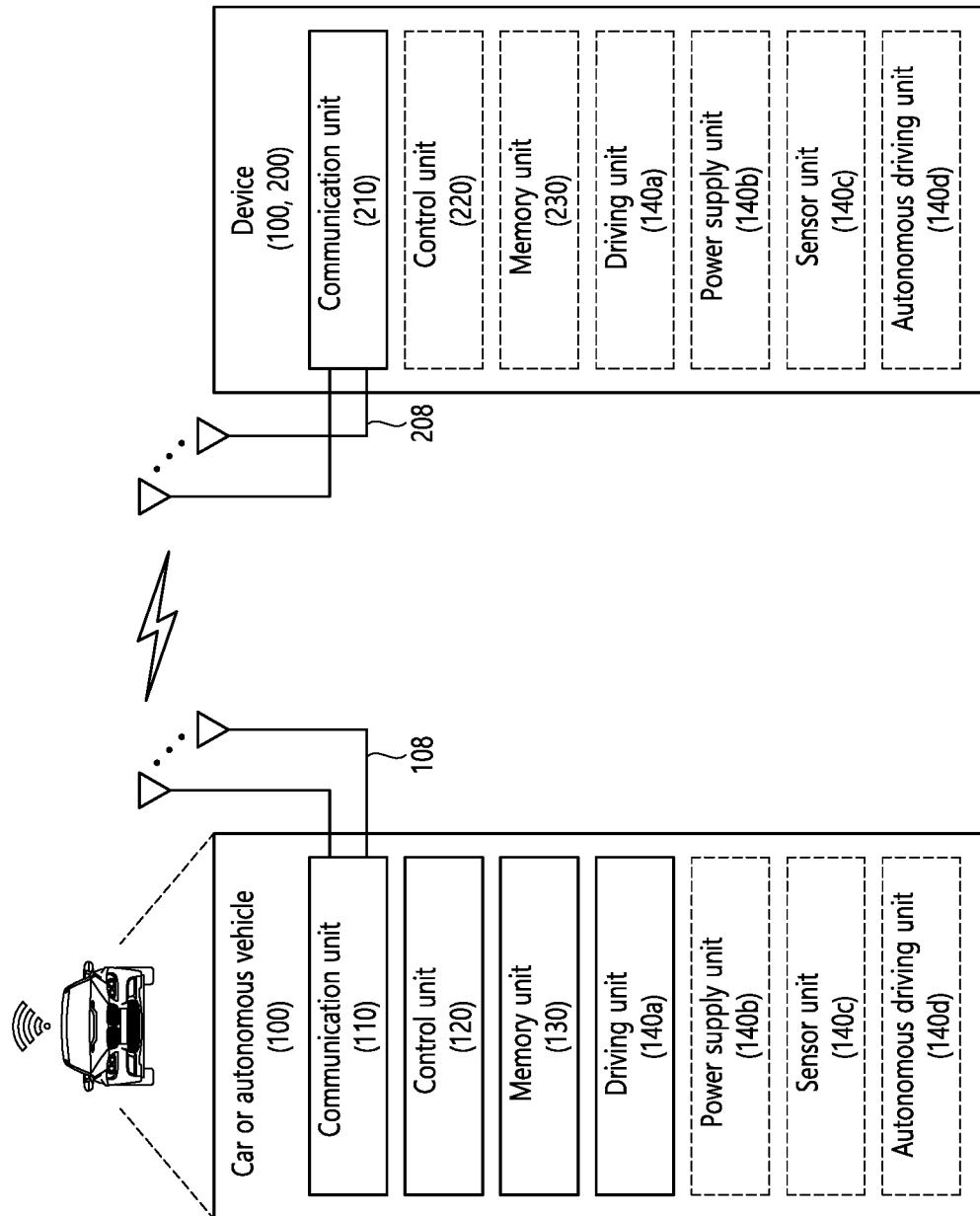
FIG. 20 shows a vehicle or an autonomous vehicle, based on an embodiment of the present disclosure.

FIG. 20 shows a vehicle or an autonomous vehicle, based on an embodiment of the present disclosure. The vehicle or autonomous vehicle may be implemented by a mobile robot, a car, a train, a manned/unmanned Aerial Vehicle (AV), a ship, etc.

Referring to FIG. 20, a vehicle or autonomous vehicle 100 may include an antenna unit 108, a communication unit 110, a control unit 120, a driving unit 140*a*, a power supply unit 140*b*, a sensor unit 140*c*, and an autonomous driving unit 140*d*. The antenna unit 108 may be configured as a part of the communication unit 110. The blocks 110/130/140*a* to 140*d* correspond to the blocks 110/130/140 of FIG. 18, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140*a* may cause the vehicle or the autonomous vehicle 100 to drive on a road. The driving unit 140*a* may include an engine, a motor, a powertrain, a wheel, a brake, a steering device, etc. The power supply unit 140*b* may supply power to the vehicle or the autonomous vehicle 100 and include a wired/wireless charging circuit, a battery, etc. The sensor unit 140*c* may acquire a vehicle state, ambient environment information, user information, etc. The sensor unit 140*c* may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140*d* may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140*d* may generate an autonomous driving path and a driving plan from the obtained data. The control unit 120 may control the driving unit 140*a* such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140*c* may obtain a vehicle state and/or surrounding environment information. The autonomous driving unit 140*d* may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method for performing wireless communication by a first device, the method comprising:
transmitting, to a second device through a physical sidelink control channel (PSCCH), a first sidelink control information (SCI) including scheduling information for a physical sidelink shared channel (PSSCH), information for a physical sidelink feedback channel (PSFCH) overhead, and a beta offset; and
transmitting, to the second device through the PSSCH, a second SCI and data,
wherein a transport block size (TBS) of the data is determined based on a total number of resource elements (REs) allocated for the PSSCH,
wherein the total number of REs allocated for the PSSCH is determined based on a number of REs allocated for the PSSCH within a physical resource block (PRB), and a total number of allocated PRBs for the PSSCH,
wherein the number of REs allocated for the PSSCH within the PRB is determined based on the PSFCH overhead informed by the first SCI, and
wherein a number of REs for transmission of the second SCI is determined based on i) a number of symbols of the PSSCH derived from the PSFCH overhead informed by the first SCI, and ii) the beta offset.

2. The method of claim 1, further comprising:
mapping, based on the number of REs to which the second SCI is mapped, the second SCI to a resource related to the PSSCH.

3. The method of claim 1, wherein the number of symbols of the PSSCH is a value obtained by subtracting the PSFCH overhead from a sidelink (SL) symbol length.

4. The method of claim 3, wherein the SL symbol length is related to a SL bandwidth part (BWP) configured for the first device.

5. The method of claim 3, wherein the PSFCH overhead is determined based on a period of a PSFCH resource related to a resource pool or the PSFCH overhead informed by the first SCI.

6. The method of claim 5, wherein, based on the period of the PSFCH resource set to 0, the PSFCH overhead is 0.

7. The method of claim 5, wherein, based on the period of the PSFCH resource set to 1, the PSFCH overhead is 3.

8. The method of claim 5, wherein the PSFCH overhead is 3 based on (i) the period of the PSFCH resource set to 2 or 4, and (ii) the information for the PSFCH overhead representing 1.

9. The method of claim 5, wherein the PSFCH overhead is 0 based on (i) the period of the PSFCH resource set to 2 or 4, and (ii) the information for the PSFCH overhead representing 0.

10. The method of claim 1, further comprising:
obtaining a number of REs allocated for the PSSCH, based on the number of symbols of the PSSCH and a demodulation reference signal (DMRS) overhead,
wherein the first SCI includes information for the DMRS overhead, and
wherein the DMRS overhead is a number of REs related to a DMRS for the PSSCH.

11. The method of claim 1, wherein the beta offset is selected from among a plurality of beta offsets configured for a resource pool.

12. The method of claim 1, wherein a DMRS for the PSSCH is mapped to at least one symbol on a resource related to the PSSCH, and
wherein the second SCI is mapped from 1st symbol among the at least one symbol.

13. A first device adapted to perform wireless communication, the first device comprising:
one or more memories storing instructions;
one or more transceivers; and
one or more processors connected to the one or more memories and the one or more transceivers, wherein the one or more processors, based on executing the instructions, perform operations comprising:
transmitting, to a second device through a physical sidelink control channel (PSCCH), a first sidelink control information (SCI) including scheduling information for a physical sidelink shared channel (PSSCH), information for a physical feedback channel (PSFCH) overhead, and a beta offset; and
transmitting, to the second device through the PSSCH, a second SCI and data,
wherein a transport block size (TBS) of the data is determined based on a total number of resource elements (REs) allocated for the PSSCH,
wherein the total number of REs allocated for the PSSCH is determined based on a number of REs allocated for the PSSCH within a physical resource block (PRB), and a total number of allocated PRBs for the PSSCH,
wherein the number of REs allocated for the PSSCH within the PRB is determined based on the PSFCH overhead informed by the first SCI, and
wherein a number of REs for transmission of the second SCI is determined based on i) a number of symbols of the PSSCH derived from the PSFCH overhead informed by the first SCI, and ii) the beta offset.

14. The first device of claim 13, wherein the number of symbols of the PSSCH is a value obtained by subtracting the PSFCH overhead from a sidelink (SL) symbol length.

15. The first device of claim 14, wherein the SL symbol length is related to a SL bandwidth part (BWP) configured for the first device.

16. The first device of claim 13, wherein the PSFCH overhead is determined based on a period of a PSFCH resource related to a resource pool or the PSFCH overhead information in the first SCI.

17. The first device of claim 16, wherein, based on the period of the PSFCH resource set to 0, the PSFCH overhead is 0.

18. The first device of claim 16, wherein, based on the period of the PSFCH resource set to 1, the PSFCH overhead is 3.

19. A processing device adapted to control a first device performing wireless communication, the processing device comprising:
one or more processors; and
one or more memories operably connected to the one or more processors and storing instructions, wherein the one or more processors, based on executing the instructions, perform operations comprising:
transmitting, to a second device through a physical sidelink control channel (PSCCH), a first sidelink control information (SCI) including scheduling information for a physical sidelink shared channel (PSSCH), information for a physical sidelink feedback channel (PSFCH) overhead and a beta offset; and
transmitting, to the second device through the PSSCH, a second SCI and data, wherein a transport block size (TBS) of the data is determined based on a total number of resource elements (REs) allocated for the PSSCH, wherein the total number of REs allocated for the PSSCH is determined based on a number of REs allocated for the PSSCH within a physical resource block (PRB), and a total number of allocated PRBs for the PSSCH, wherein the number of REs allocated for the PSSCH within the PRB is determined based on the PSFCH overhead informed by the first SCI, and wherein a number of REs for transmission of the second SCI is determined based on i) a number of symbols of the PSSCH derived from the PSFCH overhead informed by the first SCI, and ii) the beta offset.

* * * * *